United States Patent
Inoue et al.

(10) Patent No.: US 11,760,479 B2
(45) Date of Patent: Sep. 19, 2023

(54) UNMANNED AIRCRAFT, INFORMATION PROCESSING METHOD, AND RECORDING MEDIUM

(71) Applicant: Panasonic Intellectual Property Management Co., Ltd., Osaka (JP)

(72) Inventors: Kazuo Inoue, Osaka (JP); Kazunobu Konishi, Osaka (JP); Stephen John, Nara (JP); Katsuhiko Asai, Nara (JP); Shunsuke Kuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 373 days.

(21) Appl. No.: 17/146,944

(22) Filed: Jan. 12, 2021

(65) Prior Publication Data

US 2021/0129990 A1  May 6, 2021

Related U.S. Application Data

(63) Continuation of application No. PCT/JP2019/046260, filed on Nov. 27, 2019.

(30) Foreign Application Priority Data

Feb. 1, 2019  (JP) ................................ 2019-016896

(51) Int. Cl.
*B64C 39/02* (2023.01)
*G08G 5/00* (2006.01)
(Continued)

(52) U.S. Cl.
CPC .......... *B64C 39/024* (2013.01); *G08G 5/003* (2013.01); *B64U 30/20* (2023.01); *B64U 70/80* (2023.01);
(Continued)

(58) Field of Classification Search
CPC ............ B64D 45/00; B64D 2045/0085; B64C 39/024; B64C 2201/042; B64C 2201/146; G05D 1/0858
See application file for complete search history.

(56) References Cited

U.S. PATENT DOCUMENTS 9,376,208 B1 * 6/2016 Gentry .................. B64D 35/08
9,639,087 B1 * 5/2017 Cutler .................. G05D 1/0055
(Continued)

FOREIGN PATENT DOCUMENTS

JP  2005-263112  9/2005
JP  4222510  2/2009

OTHER PUBLICATIONS

Extended European Search Report dated Mar. 10, 2022 in corresponding European Patent Application No. 19912477.7
(Continued)

*Primary Examiner* — Hussein Elchanti
(74) *Attorney, Agent, or Firm* — Wenderoth, Lind & Ponack, L.L.P.

(57) ABSTRACT

An unmanned aircraft includes: at least two generators generating forces to fly the unmanned aircraft, each including a rotor blade generating an airflow; a sensor detecting a tilt of the unmanned aircraft; and a processor controlling the generators to control flight of the unmanned aircraft. The processor: obtains an output force adjustment trigger for the generators; obtaining the trigger, causes each generator to individually operate at least until the tilt of the unmanned aircraft detected by the sensor satisfies a predetermined condition; determines a reference value related to an output force of each generator from a value related to the output force of each generator when the tilt of the unmanned aircraft satisfies the predetermined condition and a positional relationship between the generators; and controls the
(Continued)

flight of the unmanned aircraft, using the reference values determined.

10 Claims, 18 Drawing Sheets

(51) Int. Cl.
    *B64U 30/20*     (2023.01)
    *B64U 70/80*     (2023.01)
    *B64U 101/00*     (2023.01)

(52) U.S. Cl.
    CPC ...... *B64U 2101/00* (2023.01); *B64U 2201/20* (2023.01)

(56) References Cited

U.S. PATENT DOCUMENTS

| | | | | |
|---|---|---|---|---|
| 9,828,107 | B1* | 11/2017 | Ruymgaart | B64D 31/00 |
| 10,053,236 | B1 | 8/2018 | Buchmueller et al. | |
| 10,082,439 | B1* | 9/2018 | Helppi | B64D 45/00 |
| 10,124,893 | B1* | 11/2018 | Aalund | G08C 17/02 |
| 11,459,960 | B2* | 10/2022 | Darfeuil | B64D 31/02 |
| 2011/0057075 | A1* | 3/2011 | Hursig | B64C 27/20 244/175 |
| 2012/0091260 | A1 | 4/2012 | Callou | |
| 2016/0246304 | A1 | 8/2016 | Canoy et al. | |
| 2017/0148236 | A1* | 5/2017 | Sannino | G06F 16/242 |
| 2017/0313433 | A1* | 11/2017 | Ozaki | B64D 17/80 |
| 2018/0227469 | A1* | 8/2018 | Osanai | H04N 23/60 |
| 2018/0354623 | A1* | 12/2018 | Bhat | B64C 39/024 |
| 2019/0011932 | A1* | 1/2019 | McGrath | G05D 1/0875 |
| 2019/0017569 | A1* | 1/2019 | Eller | G05D 1/0858 |
| 2019/0144116 | A1* | 5/2019 | Yuan | B64C 27/08 701/3 |
| 2019/0235527 | A1* | 8/2019 | O'Brien | B64D 9/00 |
| 2020/0079487 | A1* | 3/2020 | Shim | B64B 1/58 |
| 2020/0122832 | A1* | 4/2020 | Morris | B64C 27/52 |
| 2020/0223547 | A1* | 7/2020 | Mehta | B64C 39/024 |
| 2020/0312163 | A1* | 10/2020 | Dürr | F03D 80/00 |
| 2020/0398983 | A1* | 12/2020 | Singh | B64U 50/19 |

OTHER PUBLICATIONS

International Search Report (ISR) dated Feb. 18, 2020 in International (PCT) Application No. PCT/JP2019/046260.

* cited by examiner

UNMANNED AIRCRAFT, INFORMATION PROCESSING METHOD, AND RECORDING MEDIUM

CROSS REFERENCE TO RELATED APPLICATIONS

This is a continuation application of PCT International Application No, PCT/JP2019/046260 filed on Nov. 27, 2019, designating the United States of America, which is based on and claims priority of Japanese Patent Application No. 2019-016896 filed on Feb. 1, 2019. The entire disclosures of the above-identified applications, including the specifications, drawings and claims are incorporated herein by reference in their entirety.

FIELD

The present disclosure relates to an unmanned aircraft loaded with freight, an information processing method of controlling such unmanned aircraft, and a recording medium.

BACKGROUND

In recent years, unmanned aircrafts such as drones have been used for freight delivery. For example, Patent Literature (PTL) 1 discloses a technology that relates to such an unmanned aircraft.

CITATION LIST

Patent Literature

PTL 1: Japanese Patent No. 4222510

SUMMARY

Technical Problem

In some cases, however, it is difficult for an unmanned aircraft to fly with stability when loaded with freight. For example, when the center of gravity of the unmanned aircraft and the center of gravity of the freight on the unmanned aircraft do not match in a horizontal direction, the unmanned aircraft cannot rise up, maintaining its horizontal attitude. As such, it is hard for the unmanned aircraft to fly with stability.

In view of the above, the present disclosure aims to provide an unmanned aircraft and so forth capable of stable flight even when the unmanned aircraft is loaded with freight.

Solution to Problem

The unmanned aircraft according to the present disclosure is an unmanned aircraft, including: at least two generators that generate forces to fly the unmanned aircraft, the at least two generators each including a rotor blade that generates an airflow; a sensor that detects a tilt of the unmanned aircraft; and a processor that controls the at least two generators to control flight of the unmanned aircraft. In this unmanned aircraft, the processor: obtains an output force adjustment trigger for the at least two generators; upon obtaining the output force adjustment trigger, causes each of the at least two generators to individually operate at least until the tilt of the unmanned aircraft detected by the sensor satisfies a predetermined condition; determines a reference value related to an output force of each of the at least two generators from (i) a value related to the output force of each of the at least two generators at a timing at which the tilt of the unmanned aircraft satisfies the predetermined condition and (ii) a positional relationship between the at least two generators; and controls the flight of the unmanned aircraft, using the reference values determined.

Note that these comprehensive or specific aspects may be implemented as a system, a device, a method, an integrated circuit, a computer program, or a non-transitory, computer-readable recording medium such as a CD-ROM, or may be implemented as any combination of a system, a device, a method, an integrated circuit, a computer program, and a recording medium.

Advantageous Effects

The unmanned aircraft and so forth according to an aspect of the present disclosure are capable of stable flight even when the unmanned aircraft is loaded with freight.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1A:
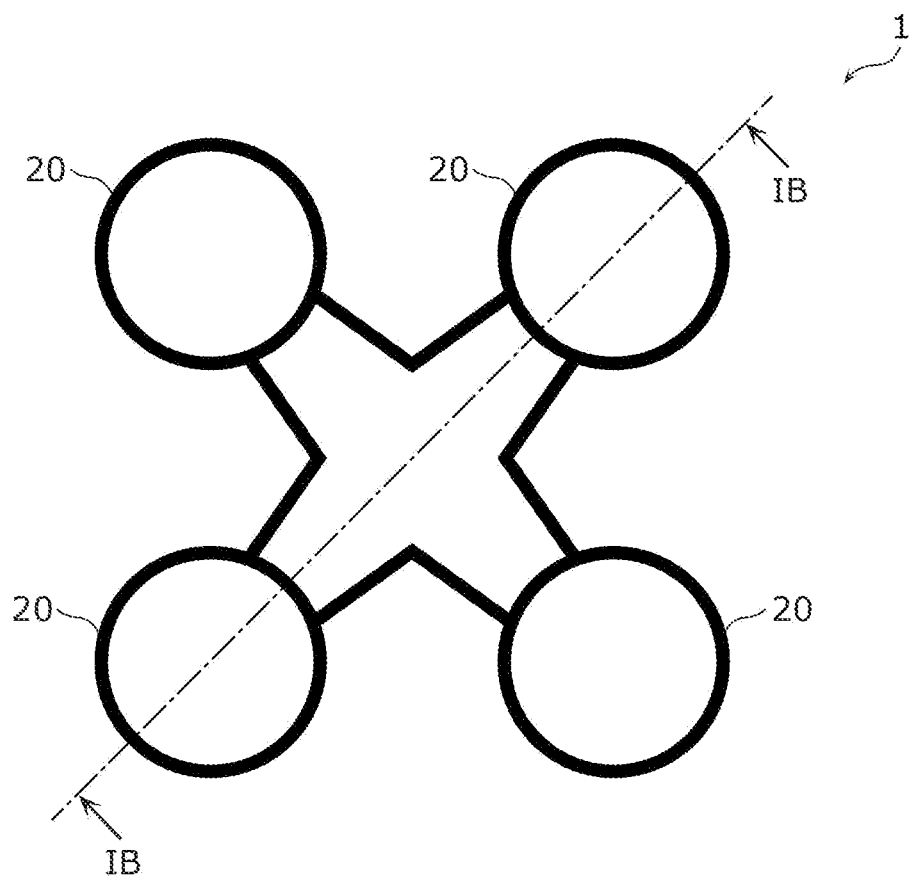
FIG. 1A is a top view of an example of an unmanned aircraft according to an embodiment.

The unmanned aircraft according to an aspect of the present disclosure is an unmanned aircraft, including: at least two generators that generate forces to fly the unmanned aircraft, the at least two generators each including a rotor blade that generates an airflow; a sensor that detects a tilt of the unmanned aircraft; and a processor that controls the at least two generators to control flight of the unmanned aircraft. In this unmanned aircraft, the processor: obtains an output force adjustment trigger for the at least two generators; upon obtaining the output force adjustment trigger, causes each of the at least two generators to individually operate at least until the tilt of the unmanned aircraft detected by the sensor satisfies a predetermined condition; determines a reference value related to an output force of each of the at least two generators from (i) a value related to the output force of each of the at least two generators at a timing at which the tilt of the unmanned aircraft satisfies the predetermined condition and (ii) a positional relationship between the at least two generators; and controls the flight of the unmanned aircraft, using the reference values determined.

When at least two generators are operated on the basis of the same output force-related value, in the case where the position of the center of gravity of the freight and the center of the unmanned aircraft do not match in a top view of the unmanned aircraft, the unmanned aircraft is tilted toward the direction of the position of the center of gravity of the freight with respect to the center of the unmanned aircraft. As a result, the unmanned aircraft is drifted toward such direction. In view of this, each of at least two generators is individually operated to calculate the values related to their respective output forces at that time. The values related to the output forces of at least two generators when they are individually operated are, for example, different from one another. More specifically, the value related to the output force of a generator close to the position of the center of gravity is larger, and the value related to the output force of a generator distant from the position of the center of gravity is smaller. The reference values related to the output forces of at least two generators are then determined from the values related to the output forces of at least two generators and their positional relationship. The reference values of at least two generators are, for example, values different from one another. The use of these reference values in the flight of the unmanned aircraft prevents the unmanned aircraft from being tilted. This thus enables the unmanned aircraft to fly with stability even when loaded with freight.

Also, the predetermined condition may be that the tilt of the unmanned aircraft changes.

According to this, the timing at which the tilt of the unmanned aircraft changes is the timing at which the unmanned aircraft starts rising up. The values related to the output forces at the instant at which the unmanned aircraft starts rising up are the same as the values at the instant at which the force of the unmanned aircraft to rise up is balanced with the weight of the unmanned aircraft (the magnitude of the gravity acting on the unmanned aircraft). For this reason, the reference values are more accurately determined from the values related to the output forces at the timing at which the tilt of the unmanned aircraft changes.

Also, the reference value may be an output force value at which the unmanned aircraft is able to fly in a horizontal attitude in hovering flight.

As in the above configuration, the reference value enables the unmanned aircraft to fly in a horizontal attitude in hovering flight.

Also, the processor may determine the reference value of each of the at least two generators, based on (i) the value related to the output force of each of the at least two generators at the timing at which the tilt of the unmanned aircraft satisfies the predetermined condition and (ii) a center of gravity of the unmanned aircraft that is calculated from the positional relationship between the at least two generators.

According to this, the calculation of the center of gravity enables the determination of the reference values at which rotational moments are balanced. This thus prevents the unmanned aircraft from being tilted when the unmanned aircraft is rising up even in the case where the position of the center of gravity of the freight and the center of the unmanned aircraft do not match in a top view of the unmanned aircraft.

Also, the unmanned aircraft may further include: a communication unit. Here, the output force adjustment trigger may be an output force adjustment instruction or a flight instruction obtained via the communication unit.

With this configuration, the process that enables the unmanned aircraft to fly with stability is started by performing communication with the unmanned aircraft.

Also, the unmanned aircraft may further include: an operation interface. Here, the output force adjustment trigger may be an output force adjustment instruction obtained via the operation interface.

With this configuration, the process that enables the unmanned aircraft to fly with stability is started by operating the unmanned aircraft.

Also, the processor may further determine whether the reference value is within an acceptable range, and may present information indicating that the reference value is not within the acceptable range via a presentation unit when the reference value is not within the acceptable range.

According to this, when the position of the center of gravity of the freight is largely deviated from the center of the unmanned aircraft in a top view of the unmanned aircraft, for example, there is a possibility that a reference value does not fall within the acceptable range. In such situation, the present configuration enables to present such fact to the operator, etc. of the unmanned aircraft, thus enabling the operator, etc. to, for example, change freights or adjust the loading positions of the freight.

Also, the processor may further determine whether a determination of the reference value has been completed, and may present information indicating that the determination of the reference value has been completed via a presentation unit when the determination of the reference value has been completed.

This configuration enables to present information indicating that the determination of the reference values has been completed to the operator, etc. of the unmanned aircraft, thereby enabling the operator, etc, to start, for example, the normal flight of the unmanned aircraft.

The information processing method according to the present disclosure is an information processing method of controlling an unmanned aircraft that includes: at least two generators that generate forces to fly the unmanned aircraft, the at least two generators each including a rotor blade that generates an airflow; and a sensor that detects a tilt of the unmanned aircraft. Such information processing method is executed by a computer to control the unmanned aircraft by controlling the at least two generators. The information processing method includes: obtaining an output force adjustment trigger for the at least two generators; upon obtainment of the output force adjustment trigger, causing each of the at least two generators to individually operate at least until the tilt of the unmanned aircraft detected by the sensor satisfies a predetermined condition; determining a reference value related to an output force of each of the at least two generators from (i) a value related to the output force of each of the at least two generators at a timing at which the tilt of the unmanned aircraft satisfies the predetermined condition and (ii) a positional relationship between the at least two generators; and controlling the flight of the unmanned aircraft, using the reference values determined.

According to this, the present disclosure is capable of providing an information processing method that enables the unmanned aircraft to fly with stability even when the unmanned aircraft is loaded with freight.

The recording medium according to an aspect of the present disclosure is a non-transitory computer-readable recording medium having a program recorded thereon for causing a computer to execute the foregoing information processing method.

According to this, the present disclosure is capable of providing a recording medium recorded thereon a program that enables the unmanned aircraft to fly with stability even when the unmanned aircraft is loaded with freight.

Also, these comprehensive or specific aspects may be implemented as a system, a device, a method, an integrated circuit, a computer program, or a non-transitory, computer-readable recording medium such as a CD-ROM, or may be implemented as any combination of a system, a device, a method, an integrated circuit, a computer program, and a recording medium.

The following specifically describes the embodiment with reference to the drawings, Note that the following embodiment shows a comprehensive or specific illustration. The numerical values, shapes, materials, structural components, the arrangement and connection of the structural components, steps, the processing order of the steps, etc. shown in the following embodiment are mere examples, and thus are not intended to limit the scope of the claims. Of the structural components described in the following embodiment, structural components not recited in any one of the independent claims that indicate the broadest concepts of the present disclosure will be described as optional structural components, Also note that the drawings used in the following description are schematic diagrams, and thus they are not necessarily precise illustrations of the arrangement and scale of the structural components.

Embodiment

Figure 1B:
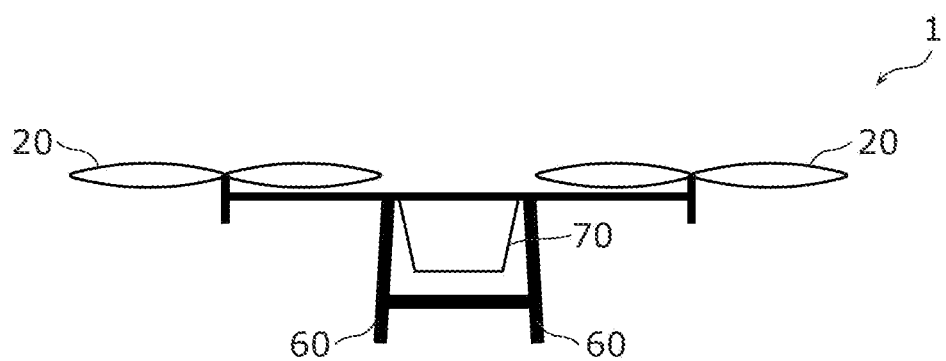
FIG. 1B is a cross-sectional view of an example of the unmanned aircraft according to the embodiment.
Figure 2:
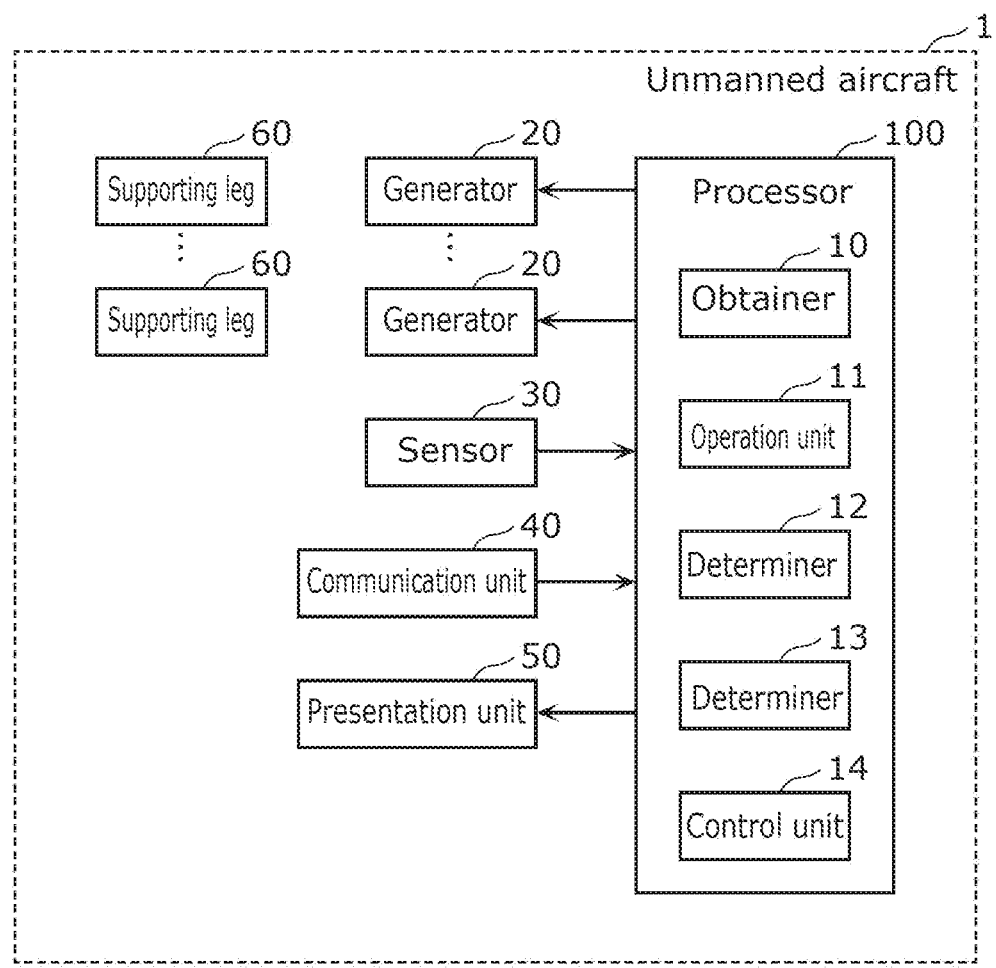
FIG. 2 is a diagram showing the structure of an example of the unmanned aircraft according to the embodiment.

With reference to FIG. 1A through FIG. 15, the embodiment will be described,

FIG. 1A is a top view of an example of u manned aircraft 1 according to the embodiment. FIG. 1B is a cross-sectional view of an example of unmanned aircraft 1 according to the embodiment. FIG. 1B shows a cross-section cut along 1B-1B line shown in FIG. 1A. Note that FIG. 1A schematically illustrates rotor blades as circles. FIG. 2 is a diagram showing the structure of an example of unmanned aircraft 1 according to the embodiment.

Unmanned aircraft 1 is referred to also as a drone or an unmanned aerial vehicle (UAV). Unmanned aircraft 1 in the present disclosure is loaded with freight, and used, for example, for such purposes as delivery. Note that unmanned aircraft 1 may not be used for delivery purposes, in which case freight is not limited to articles to be delivered. For example, freight may be a camera and a microphone, etc. installed in unmanned aircraft 1. When the position of the center of gravity of the freight and the center of unmanned aircraft 1 match in a top view of unmanned aircraft 1, for example, the unmanned aircraft can rise up in a horizontal attitude. When not, however, the unmanned aircraft cannot rise up, maintaining its horizontal attitude. Consequently, unmanned aircraft 1 is drifted toward the position of the center of gravity of the freight with respect to the center of unmanned aircraft 1. The present disclosure describes unmanned aircraft 1 and so forth capable of stable flight even when unmanned aircraft 1 is loaded with freight.

As shown in FIG. 1A, FIG. 1B, and FIG. 2, unmanned aircraft 1 includes at least two generators 20 that generate forces to fly unmanned aircraft 1, each including a rotor blade that generates an airflow. At least two generators 20 are interconnected by a chassis that connects the shafts of at least two generators 20. As shown in FIG. 1A, for example, unmanned aircraft 1 includes four generators 20 that are located, for example, on diagonal lines. Note that the number of at least two generators 20 is not limited to four. For example, the first through third examples described below use four generators 20 as shown in FIG. 1A, but unmanned aircraft 1 in the fourth example includes six generators 20.

Also, as shown in FIG. 1B, unmanned aircraft 1 includes at least two supporting legs 60 that are in contact with the ground to support unmanned aircraft 1 when unmanned aircraft 1 is on the ground. At least two supporting legs 60 are provided, for example, in correspondence with at least two generators 20. For example, unmanned aircraft 1 includes four supporting legs 60 that are provided on diagonal lines in correspondence with four generators 20. Note that the number of at least two supporting legs 60 is not limited to four. For example, the first, second, and fourth examples described below use four supporting legs 60, but the third example uses three supporting legs 60. Also, at least two supporting legs 60 may not be provided in correspondence with at least two generators 20 so long as at least two supporting legs 60 are capable of reliably supporting unmanned aircraft 1 on the ground. For example, as in the second and third examples described below, at least two supporting legs 60 may be provided on diagonal lines that are different from the diagonal lines on which at least two generators 20 are provided.

Unmanned aircraft 1 includes housing 70 in which freight is loaded. Housing 70 is provided, for example, at around the center in a top view of unmanned aircraft 1. Housing 70 may take any form that allows freight to be contained or placed. Non-limiting examples of housing 70 include a box, a sack, and a tray.

Although not illustrated in FIG. 1A and FIG. 1B, unmanned aircraft 1 includes sensor 30, communication unit 40, presentation unit 50, and processor 100.

Sensor 30 is a sensor, such as a gyroscope sensor and an acceleration sensor, that detects the tilt of unmanned aircraft 1, Unmanned aircraft 1 may include, as sensor 30, both or only one of a gyroscope sensor and an acceleration sensor. Unmanned aircraft 1 may also include a rotation sensor that detects the rotational speeds of the rotor blades of generators 20, in addition to sensor 30 that detects the tilt of unmanned aircraft 1.

Communication unit 40 is, for example, a communication interface that wirelessly communicates with a controller (e.g., RC transmitter) for operating unmanned aircraft 1. For example, communication unit 40 receives an output force adjustment trigger from the controller. The output force adjustment trigger will be described later.

Presentation unit 50 is configured to present specific information to an operator, etc, of unmanned aircraft 1. Examples of presentation unit 50 include a display, an LED, and a speaker. Presentation unit 50 presents information indicating, for example, that a reference output force value is not within an acceptable range and that the determination of reference output force values has been completed. This will be described in detail later. When being a display, presentation unit 50 presents such information by characters, etc., when being an LED, by emitting of light, and when being a speaker, by sound.

Figure 3:
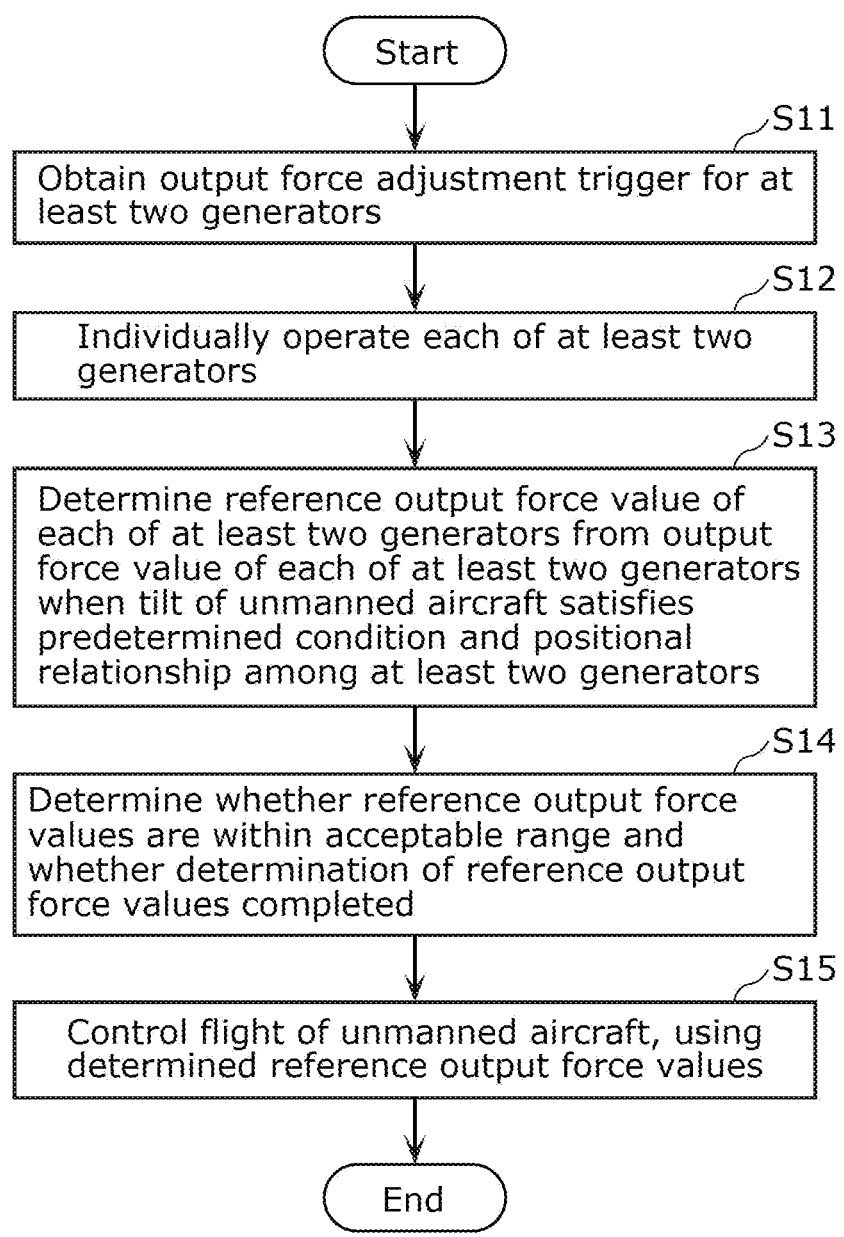
FIG. 3 is a flowchart of an exemplary operation performed by the unmanned aircraft according to the embodiment.

Processor 100 controls at least two generators 20 to control the flight of unmanned aircraft 1. When at least two generators 20 are operated on the basis of the same output force-related value, in the case where the position of the center of gravity of the freight in housing 70 and the center of unmanned aircraft 1 do not match in a top view of unmanned aircraft 1, the unmanned aircraft is tilted toward the direction of the position of the center of gravity of the freight with respect to the center of the unmanned aircraft. As a result, the unmanned aircraft is drifted toward such direction, which makes it hard for the unmanned aircraft to fly with stability. In such situation, processor 100 performs a process that enables unmanned aircraft 1 to fly with stability. Such process is a process of adjusting the values related to the respective output forces of at least two generators 20 (hereinafter also referred to as output force values), This process is thus referred to also as an output force adjustment process. The output force values of at least two generators 20 are, for example, output force values for at least two generators 20 from processor 100. More specifically, the output force values are the rotational speeds of the respective rotor blades of at least two generators 20 or instruction values indicating the rotational speeds. Alternatively, the output force values for at least two generators 20 may be, for example, output force values of the rotation sensor that detects the rotational speeds of the respective rotor blades of at least two generators 20. More specifically, the output force values may be the rotational speeds of the respective rotor blades of at least two generators 20 as a detection result of the rotation sensor. Processor 100 is a circuit for performing the output force adjustment process and so forth for unmanned aircraft 1. Processor 100 may be, for example, a microprocessor. Unmanned aircraft 1 includes a memory (not illustrated) such as a ROM and a RAM. Such memory stores a control program, etc. to be executed by processor 100, Processor 100 includes, as its functional structural components, obtainer 10, operation unit 11, determiner 12, determiner 13, and control unit 14, These functional structural components of processor 100 are implemented by the execution of the control program. With reference to FIG. 3, the following describes a detailed operation of processor 100, a detailed operation performed by obtainer 10, operation unit 11, determiner 12, determiner 13, and control unit 14.

FIG. 3 is a flowchart of an exemplary operation performed by unmanned aircraft 1 according to the embodiment, Obtainer 10 obtains an output force adjustment trigger for at least two generators 20 (step S11). The output force adjustment trigger is a trigger, in response to which processor 100 starts the process that enables unmanned aircraft 1 to fly with stability, i.e., the output force adjustment process of adjusting the output force value of each of at least two generators 20, The output force adjustment trigger is, for example, an output force adjustment instruction or a flight instruction obtained via communication unit 40. Stated differently, the output force adjustment process is started by obtainer 10 obtaining an output force adjustment instruction for starting the output force adjustment process or a flight instruction for starting the flight of unmanned aircraft 1 from the controller operated by the operator, etc. of unmanned aircraft 1 via communication unit 40, Note that the output force adjustment process is started in response to the flight instruction for starting the flight of unmanned aircraft 1, thereby enabling to check, before the flight of unmanned aircraft 1 starts, whether unmanned aircraft 1 is able to fly with stability. The processes of step S12 and step S13 to be described later, which are specific details of the output force adjustment process, are performed upon the obtainment of the output force adjustment trigger.

When the output force adjustment trigger is obtained, operation unit 11 causes each of at least two generators 20 to individually operate until the tilt of unmanned aircraft 1 detected by sensor 30 satisfies a predetermined condition (Step S12). Stated differently, the output force adjustment process starts upon the obtainment of the output force adjustment trigger. The output force adjustment process is a process of operating generators 20 one by one (i.e., process of rotating the rotor blades). It is possible not to start the output force adjustment process unless the output force adjustment trigger is obtained. This prevents the occurrence of a dangerous state in which the rotor blades start rotating on their own. The predetermined condition is, for example, that the tilt of unmanned aircraft 1 changes. Stated differently, the predetermined condition is determined as being satisfied when sensor 30 detects that unmanned aircraft 1 has been tilted, as a result of one generator 20 being individually operated and a portion of unmanned aircraft 1 at which such generator 20 is provided rising up from the ground. The timing at which the tilt of unmanned aircraft 1 changes is the timing at which unmanned aircraft 1 starts rising up. The output force values at the instant at which unmanned aircraft 1 starts rising up are the same as the values at the instant at which the force of unmanned aircraft 1 to rise up is balanced with the weight of unmanned aircraft 1 (the magnitude of the gravity acting on unmanned aircraft 1). For this reason, reference output force values to be described later are more accurately determined from the output force values at the timing at which the tilt of unmanned aircraft 1 changes. Note that the operation of generator 20 may be stopped at the instant at which the tilt of unmanned aircraft 1 satisfies the predetermined condition or may continue for a while after the predetermined condition is satisfied. In the above-described manner, each generator 20 keeps being operated until the portion at which each generator 20 is provided rises up from the ground.

Subsequently, determiner 12 determines a reference value (hereinafter referred to also as a reference output force value) related to the output force of each of at least two generators 20 from the output force value of each of at least two generators 20 at the timing at which the tilt of unmanned aircraft 1 satisfies the predetermined condition and the positional relationship among at least two generators 20 (Step S13). More specifically, determiner 12 determines the reference output force value of each of at least two generators 20 on the basis of the output force value of each of at least two generators 20 at the timing at which the tilt of unmanned aircraft 1 satisfies the predetermined condition and the center of gravity of unmanned aircraft 1 that is calculated from the positional relationship among at least two generators 20. The reference output force values are output force values that have been adjusted by the output force adjustment process, and that enable unmanned aircraft 1 to fly in a horizontal attitude in hovering flight. The calculation of the center of gravity enables the determination of the reference output force values at which rotational moments are balanced. This thus prevents unmanned aircraft 1 from being tilted when unmanned aircraft 1 is rising up even in the case where the position of the center of gravity of the freight and the center of unmanned aircraft 1 do not match in a top view of unmanned aircraft 1. Stated differently, unmanned aircraft 1 is able to fly in a horizontal attitude in hovering flight, on the basis of the reference output force values. A detailed process of step S13 will be described in the first through fourth examples with reference to FIG. 6, FIG. 7 and the subsequent drawings to be described later.

Subsequently, determiner 13 determines whether the reference output force values are within the acceptable range and whether the determination of the reference output force values has been completed (Step S14). A detailed process of step S14 will be described later with reference to FIG. 5.

Control unit 14 then controls the flight of unmanned aircraft 1, using the determined reference output force values (step S15). This enables unmanned aircraft 1 to fly in a horizontal attitude in hovering flight, even when unmanned aircraft 1 is loaded with freight.

Figure 4:
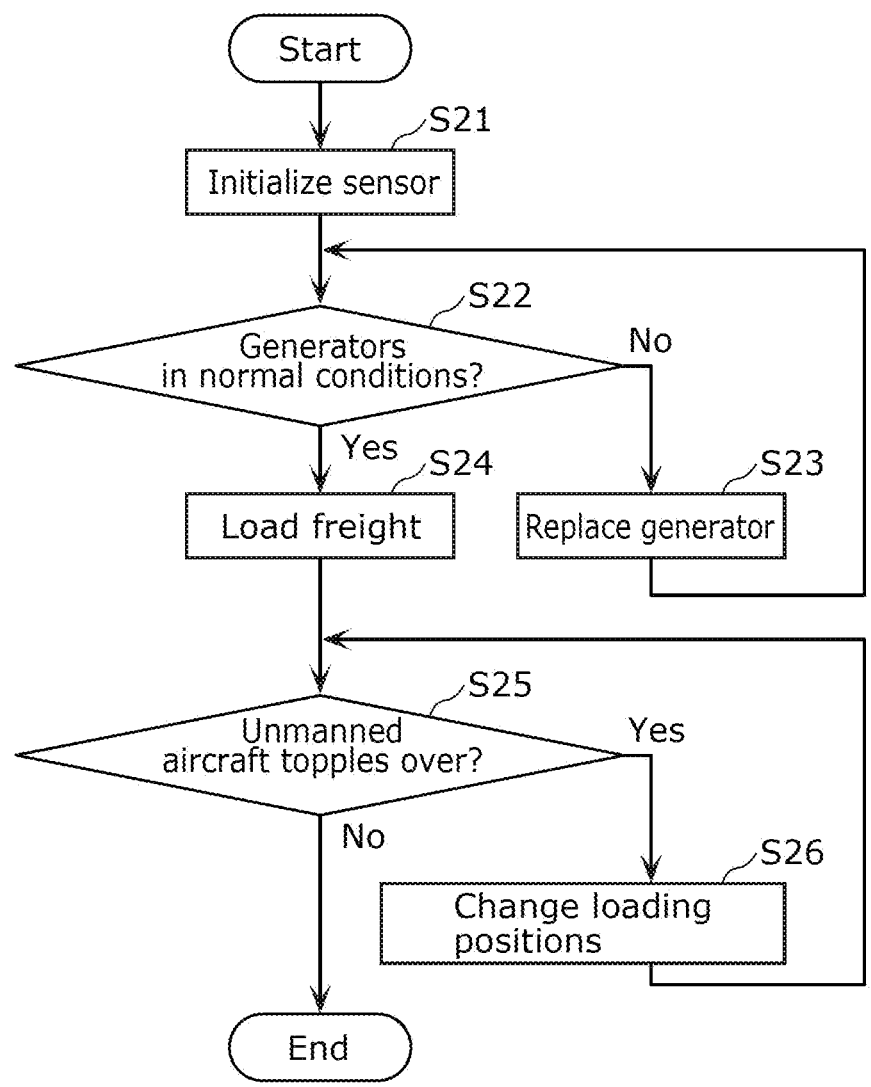
FIG. 4 is a flowchart of an exemplary operation performed before the unmanned aircraft according to the embodiment starts an output force adjustment process.

With reference to FIG. 4, the following describes an operation that is performed before the start of the output force adjustment process.

FIG. 4 is a flowchart of an exemplary operation performed before unmanned aircraft 1 according to the embodiment starts the output force adjustment process. The operation shown in FIG. 4 is performed, for example, by the operator of unmanned aircraft 1.

First, the operator initializes sensor 30 (step S21). The operator places unmanned aircraft 1 on a horizontal ground, and initializes sensor 30 so that sensor 30, when it is a gyroscope sensor, for example, recognizes that a horizontal state is the initial state, or sensor 30, when it is an acceleration sensor, for example, recognizes that the gravity acceleration of unmanned aircraft 1 standing still is 9.8 m/s$^2$.

Subsequently, the operator conducts a visual inspection, etc. to check whether generators 20 (more specifically, the rotor blades) of unmanned aircraft 1 are in normal conditions (step S22). For example, the operator checks: whether the rotor blades have any flaws, cracks, or deformation; whether the rotor blades are fixed with no looseness; whether the rotor blades cause any vibrations or noise that is bigger than usual when in rotation; and whether unmanned aircraft 1 is drifted toward a horizontal direction in hovering flight. Note that the inspection of whether generators 20 are in normal conditions may be conducted using, for example, a strain sensor or a vibration sensor.

When any of generators 20 is in an abnormal condition (No in step S22), the operator replaces generator 20 (more specifically, the rotor blade) (step S23), and performs the operation of step S22 again.

When generators 20 are in normal conditions (Yes in step S22), the operator loads unmanned aircraft 1 with freight (step S24).

Subsequently, the operator conducts a visual inspection, etc. to check whether unmanned aircraft 1 loaded with the freight topples over (step S25).

When unmanned aircraft 1 topples over (Yes in step S25), the position of the center of gravity of the freight is largely deviated from the center of unmanned aircraft 1 in a top view of unmanned aircraft 1, and thus the operator changes the loading positions of the freight (step S26), For example, the operator changes the loading positions of the freight so that the center of gravity of the freight is located inside of supporting legs 60 (i.e., the center side of unmanned aircraft 1).

The processes of step S25 and step S26 continue until unmanned aircraft 1 does not topple over. When unmanned aircraft 1 does not topple over (No in step S25), the operation that is performed before the start of the output force adjustment process ends. Note that when unmanned aircraft 1 still topples over even after changing the loading positions of the freight, there is a possibility that the center of gravity of the freight is leaning to such an extent that the loading position of the freight cannot be moved to inside of supporting legs 60, or that the freight is large to such an extent that no significant change can made in the loading positions.

In such cases, the same operation is performed on another unmanned aircraft 1 that is capable of accommodating a larger freight, or an adjustment is made on the center of gravity of the freight when it is possible to do so.

With reference to FIG. 5 through FIG. 15, the following describes a specific example of the operation performed by unmanned aircraft 1 according to the embodiment.

Figure 5:
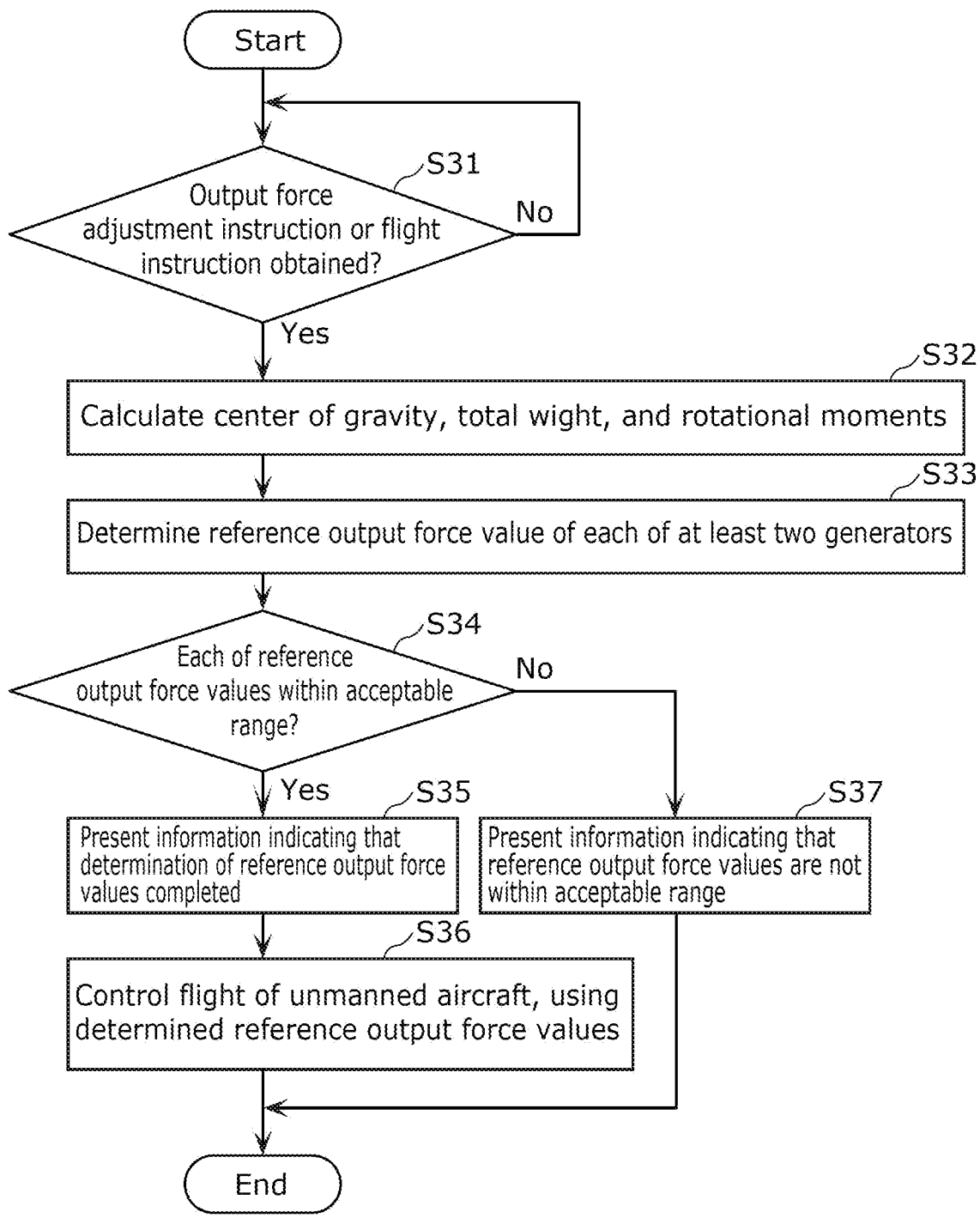
FIG. 5 is a flowchart of a specific example of an operation performed by the unmanned aircraft according to the embodiment.

FIG. 5 is a flowchart of a specific example of the operation performed by unmanned aircraft 1 according to the embodiment. In the following, the operation performed by functional structural components of processor 100 will be described as the operation of processor 100.

First, processor 100 determines whether an output force adjustment instruction or a flight instruction has been obtained (step S31).

When an output force adjustment instruction or a flight instruction has not been obtained (No in step S31), processor 100 waits for the obtainment of an output force adjustment instruction or a flight instruction.

Figure 6:
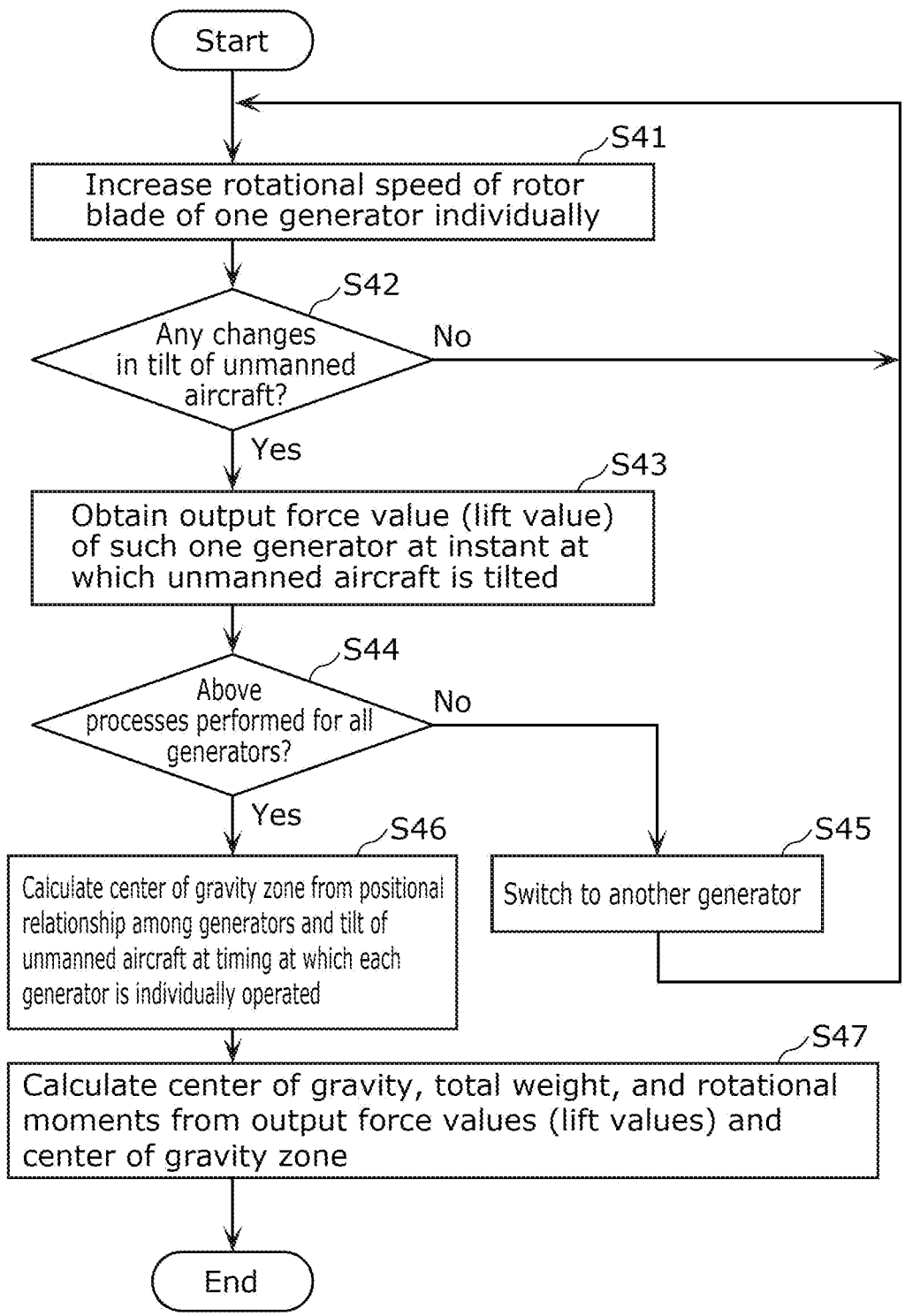
FIG. 6 is a flowchart of an exemplary method of calculating the center of gravity, the total weight, and the rotational moments related to the unmanned aircraft according to the embodiment.

When an output force adjustment instruction or a flight instruction has been obtained (Yes in step S31), processor 100 calculates the center of gravity of the freight, the total weight of unmanned aircraft 1 loaded with the freight, and the rotational moments (step S32). Note that the rotational moments are calculable from the center of gravity of the freight and the total weight of unmanned aircraft 1, and thus at least the center of gravity of the freight and the total weight of unmanned aircraft 1 are calculated here. With reference to FIG. 6, a detailed process of step S32 will be described.

FIG. 6 is a flowchart of an exemplary method of calculating the center of gravity, the total weight, and the rotational moments related to unmanned aircraft 1 according to the embodiment.

First, processor 100 increases the rotational speed of the rotor blade of one generator 20 individually (step S41).

Subsequently, processor 100 determines whether the tilt of unmanned aircraft 1 has changed (step S42).

When the tilt of unmanned aircraft 1 has not changed (No in step S42), processor 100 keeps increasing the rotational speed of the rotor blade of the above one generator 20 at least until the tilt of unmanned aircraft 1 changes.

When the tilt of unmanned aircraft 1 has changed (Yes in step S42), processor 100 obtains the output force value (e.g., instruction value) of the above one generator 20 at the instant at which unmanned aircraft 1 has been tilted (step S43). For example, since it is possible to preliminary estimate, from an output force value, the magnitude of a lift value to be generated, processor 100 converts the output force value into a lift value from the correspondence between output force values and instruction values. Output force values and lift values have correspondence with each other, and thus the following description refers to output force values and reference output force values also as lift values.

Subsequently, processor 100 determines whether the processes from step S41 through step S43 have been performed for all generators 20 (step S44).

When the processes from step S41 through step S43 have not been performed for all generators 20 (No in step S44), processor 100 switches to another generator 20 (step S45) and performs the processes from step S41 through step S43 for such generator 20, In the above-described manner, processor 100 obtains the output force value (lift value) of each of at least two generators 20 at the timing at which the tilt of unmanned aircraft 1 satisfies the predetermined condition.

Figure 7:
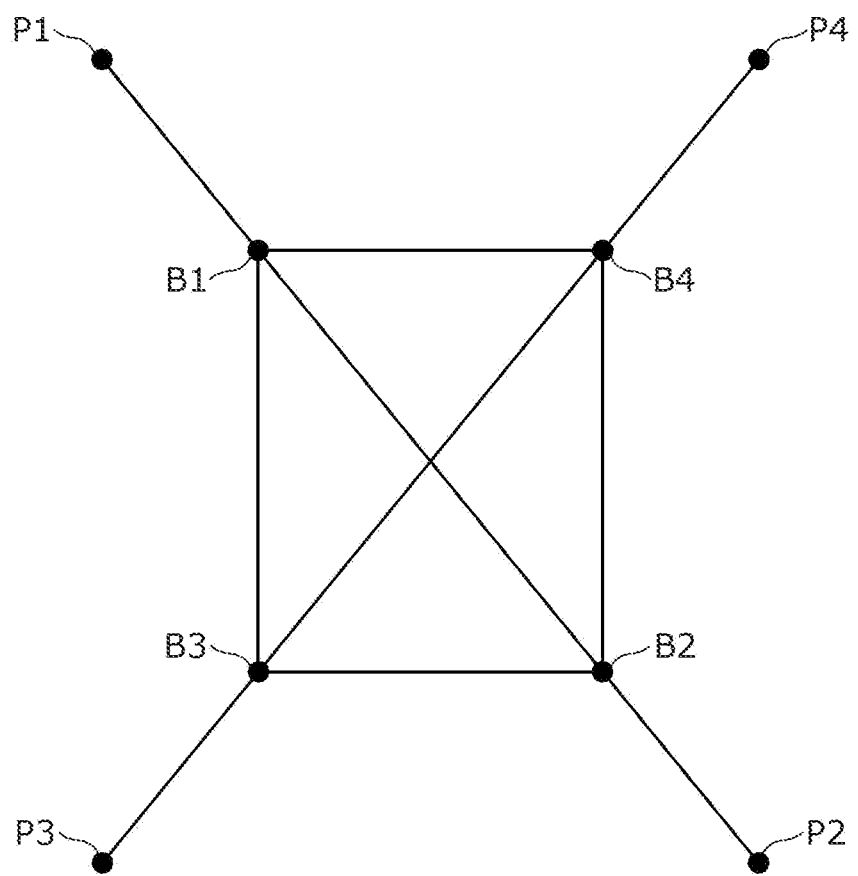
FIG. 7 is a top view of the positional relationship among generators and supporting legs of the unmanned aircraft according to a first example.

When the processes from step S41 through step S43 have been performed for all generators 20 (Yes in step S44), processor 100 calculates the center of gravity zone from the positional relationship among generators 20 and the tilt of unmanned aircraft 1 at the timing at which each generator 20 is individually operated (step S46). With reference to FIG. 7 through FIG. 8D, the process of step S46 will be described, using unmanned aircraft 1 according to the first example as an example in which generators 20 and supporting legs 60 have a positional relationship as shown in FIG. 7.

FIG. 7 is a top view of the positional relationship among generators 20 and supporting legs 60 of unmanned aircraft 1 according to the first example. FIG. 8A through FIG. 8D are top views, each showing an exemplary center of gravity zone of the freight on unmanned aircraft 1 according to the first example.

Positions P1 through P4 shown in FIG. 7 through FIG. 8D indicate the positions of generators 20 (more specifically, the central positions of the respective rotor blades), and positions B1 through B4 indicate the positions of supporting legs 60 (more specifically, that positions of supporting legs 60 which are in contact with the ground).

As shown in FIG. 7, position P1 and position P2 are located on a diagonal line, and position P3 and position P4 are located on a diagonal line. Also, position B1 and position B2 are located on a diagonal line, and position B3 and position B4 are located on a diagonal line, Positions B1 and B2 are located on a straight line connecting position P1 and position P2, and positions B3 and B4 are located on a straight line connecting position P3 and position P4. Also, position B1 is provided at the side of position P1, position B2 at the side of position P2, position 63 at the side of position P3, and position 134 at the side of position P4. The positional relationship and the number of generators 20 and supporting legs 60 in the first example are as described above.

When one generator 20 is individually operated, two of supporting legs 60 rise up from the ground, with the other two supporting legs 60 basically in contact with the ground. When the center of gravity of the freight is on a diagonal line that connects generator 20 having been operated and the opposing generator 20, three of supporting legs 60 rise up from the ground, with the other supporting leg 60 in contact with the ground. This rarely happens, and thus the following describes the case where two of supporting legs 60 rise up from the ground, with the other two supporting legs 60 in contact with the ground.

When generator 20 in position P1 is individually operated and supporting legs 60 in position B1 and position B4 start rising up from the ground, with supporting legs 60 in positions B2 and 63 in contact with the ground, the center of gravity of the freight is calculated as being located at the side of position P3 with respect to the straight line connecting positions P1 and P2. When supporting legs 60 in positions 61 and position B3 start rising up from the ground, with supporting legs 60 in positions B2 and 64 in contact with the ground, the center of gravity of the freight is calculated as being located at the side of position P4 with respect to the straight line connecting positions P1 and P2.

When generator 20 in position P2 is individually operated and supporting legs 60 in position B2 and position B3 start rising up from the ground, with supporting legs 60 in positions B1 and B4 in contact with the ground, the center of gravity of the freight is calculated as being located at the side of position P4 with respect to the straight line connecting positions P1 and P2. When supporting legs 60 in positions B2 and position B4 start rising up from the ground, with supporting legs 60 in positions B1 and B3 in contact with the ground, the center of gravity of the freight is calculated as being located at the side of position P3 with respect to the straight line connecting positions P1 and P2.

When generator 20 in position P3 is individually operated and supporting legs 60 in position B2 and position B3 start rising up from the ground, with supporting legs 60 in positions B1 and B4 in contact with the ground, the center of gravity of the freight is calculated as being located at the side of position P1 with respect to the straight line connecting positions P3 and P4. When supporting legs 60 in positions B1 and position B3 start rising up from the ground, with supporting legs 60 in positions B2 and B4 in contact with the ground, the center of gravity of the freight is calculated as being located at the side of position P2 with respect to the straight line connecting positions P3 and P4.

When generator 20 in position P4 is individually operated and supporting legs 60 in position B1 and position B4 start rising up from the ground, with supporting legs 60 in positions B2 and B3 in contact with the ground, the center of gravity of the freight is calculated as being located at the side of position P2 with respect to the straight line connecting positions P3 and P4. When supporting legs 60 in positions B2 and position B4 start rising up from the ground, with supporting legs 60 in positions B1 and B3 in contact with the ground, the center of gravity of the freight is calculated as being located at the side of position P1 with respect to the straight line connecting positions P3 and P4.

Figure 8A:
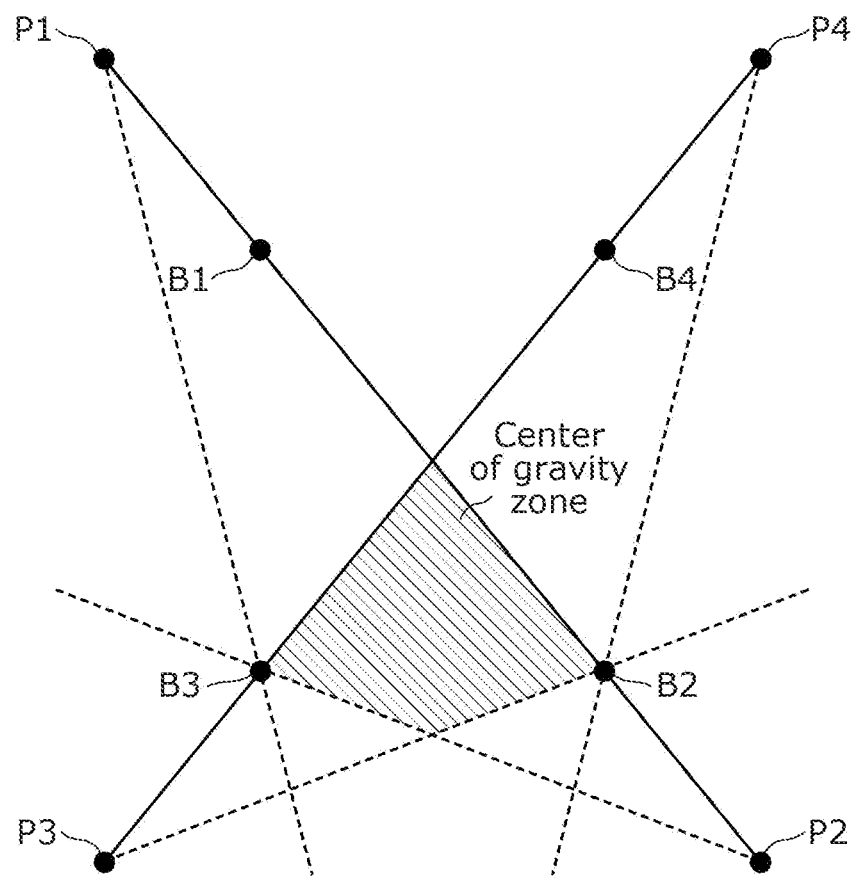
FIG. 8A is a top view of an exemplary center of gravity zone of freight on the unmanned aircraft according to the first example.

The center of gravity of the freight is calculated as being located in the center of gravity zone shown in FIG. 8A when:

generator 20 in position P1 is individually operated and supporting legs 60 in position B1 and position B4 start rising up from the ground; generator 20 in position P2 is individually operated and supporting legs 60 in position B2 and position B4 start rising up from the ground; generator 20 in position P3 is individually operated and supporting legs 60 in position B1 and position B3 start rising up from the ground; and generator 20 in position P4 is individually operated and supporting legs 60 in position B1 and position B4 start rising up from the ground.

Figure 8B:
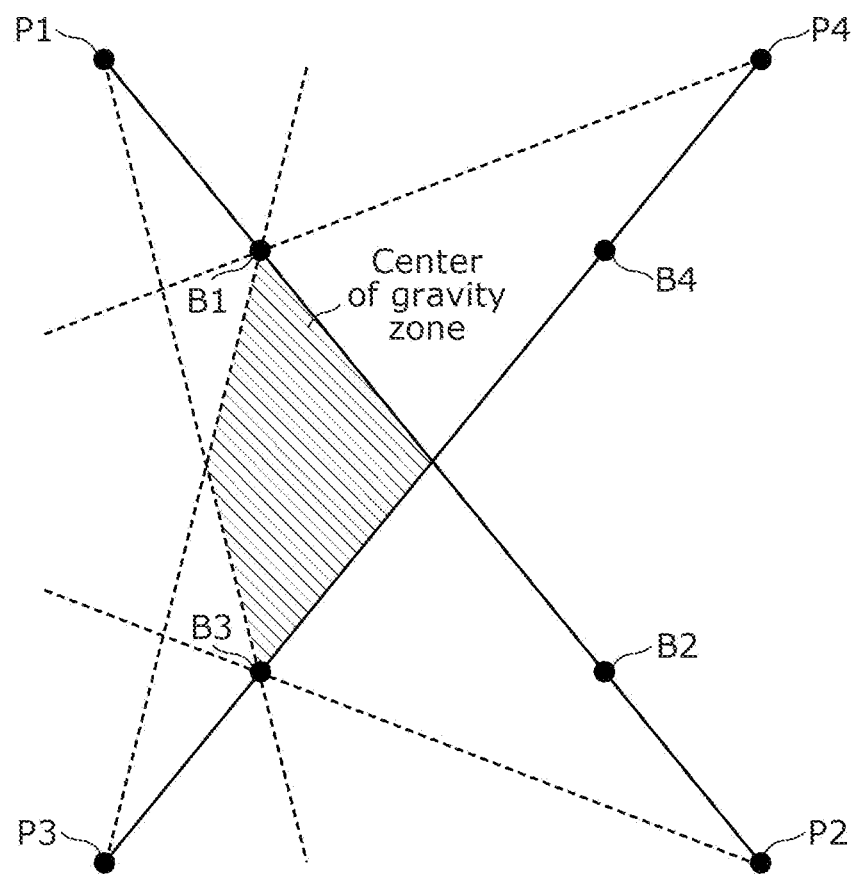
FIG. 8B is a top view of an exemplary center of gravity zone of the freight on the unmanned aircraft according to the first example.

The center of gravity of the freight is calculated as being located in the center of gravity zone shown in FIG. 8B when: generator 20 in position P1 is individually operated and supporting legs 60 in position B1 and position B4 start rising up from the ground; generator 20 in position P2 is individually operated and supporting legs 60 in position B2 and position B4 start rising up from the ground; generator 20 in position P3 is individually operated and supporting legs 60 in position B2 and position B3 start rising up from the ground; and generator 20 in position P4 is individually operated and supporting legs 60 in position B2 and position B4 start rising up from the ground.

Figure 8C:
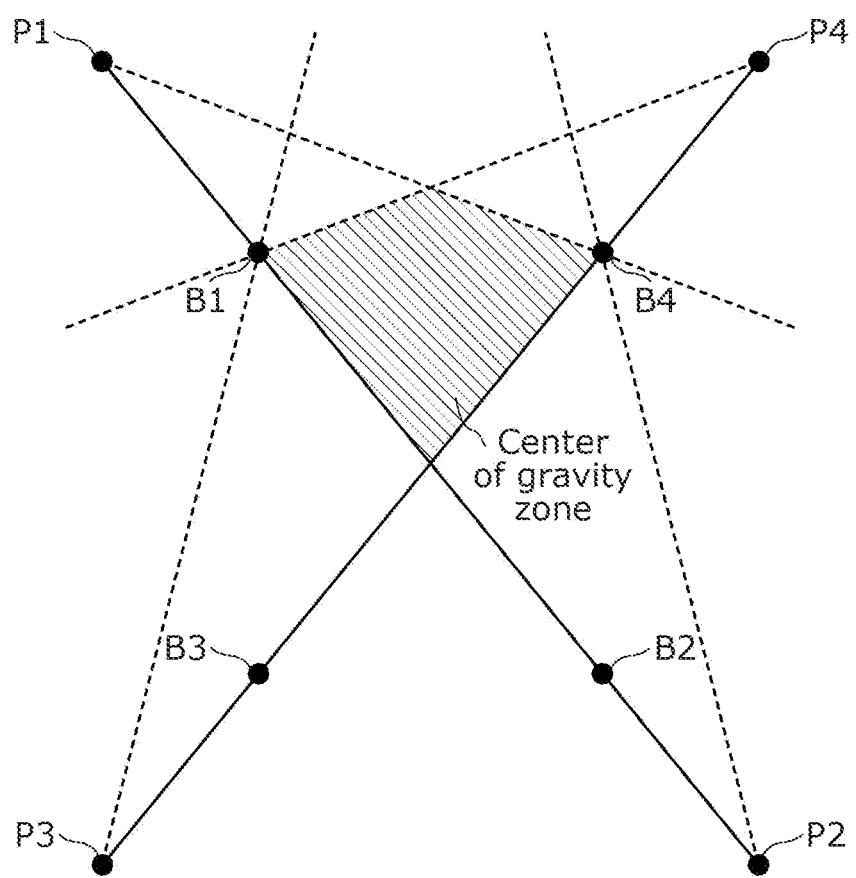
FIG. 8C is a top view of an exemplary center of gravity zone of the freight on the unmanned aircraft according to the first example.
Figure 8D:
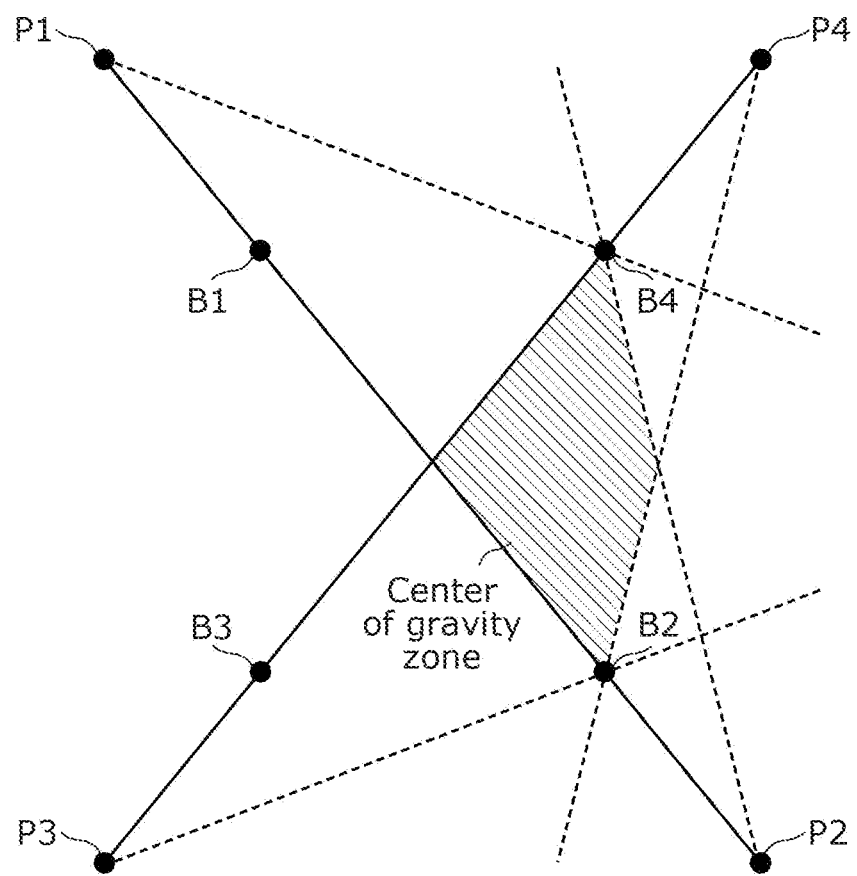
FIG. 8D is a top view of an exemplary center of gravity zone of the freight on the unmanned aircraft according to the first example.

The center of gravity of the freight is calculated as being located in the center of gravity zone shown in FIG. 8C when: generator 20 in position P1 is individually operated and supporting legs 60 in position B1 and position B3 start rising up from the ground; generator 20 in position P2 is individually operated and supporting legs 60 in position B2 and position B3 start rising up from the ground; generator 20 in position P3 is individually operated and supporting legs 60 in position B2 and position B3 start rising up from the ground; and generator 20 in position P4 is individually operated and supporting legs 60 in position B2 and position B4 start rising up from the ground.

The center of gravity of the freight is calculated as being located in the center of gravity zone shown in FIG. 8D when: generator 20 in position P1 is individually operated and supporting legs 60 in position 61 and position B3 start rising up from the ground; generator 20 in position P2 is individually operated and supporting legs 60 in position B2 and position B3 start rising up from the ground; generator 20 in position P3 is individually operated and supporting legs 60 in position B1 and position B3 start rising up from the ground; and generator 20 in position P4 is individually operated and supporting legs 60 in position B1 and position B4 start rising up from the ground.

Reverting to the description with reference to FIG. 6, processor 100 calculates the center of gravity of the freight, the total weight of unmanned aircraft 1 loaded with the freight, and the rotational moments from the output force values (lift values) and the calculated center of gravity zone (step S47).

Figure 9:
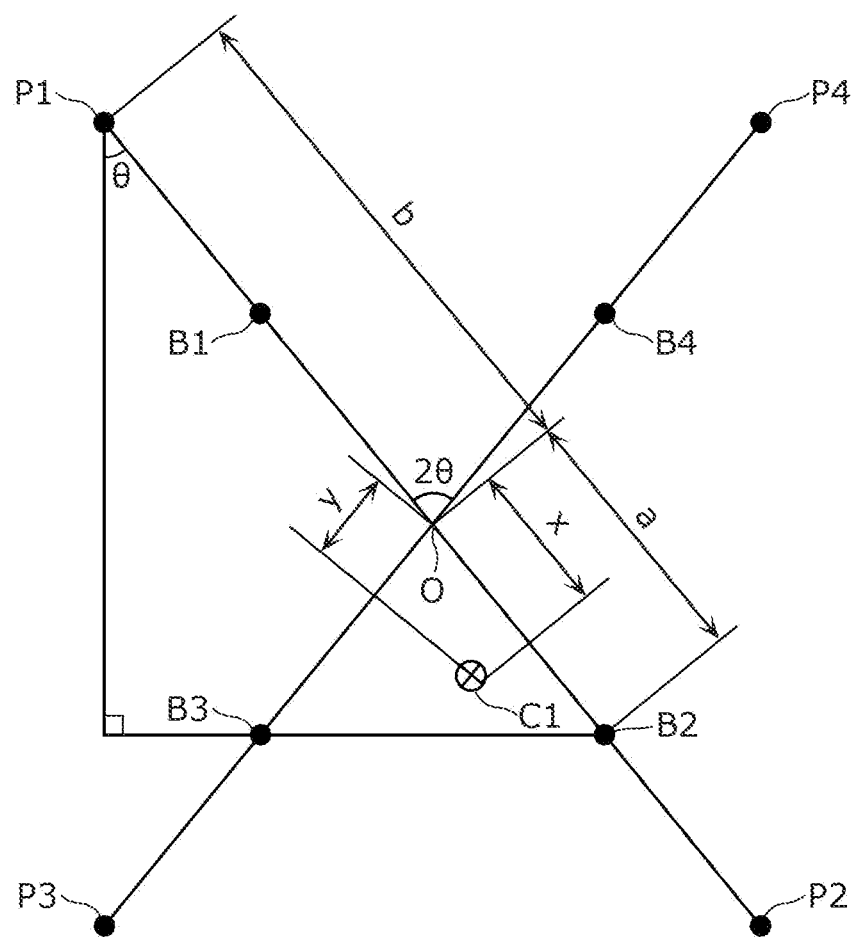
FIG. 9 is a top view for explaining a method of determining a reference output force value of each of the generators of the unmanned aircraft according to the first example.

Reverting to the description with reference to FIG. 5, processor 100 determines the reference output force value of each of at least two generators 20, on the basis of the center of gravity of the freight, the total weight of unmanned aircraft 1 loaded with the freight, and the rotational moments (step S33). With reference to FIG. 9, the processes of step S47 and step S33 will be described, using unmanned aircraft 1 according to the first example as an example.

FIG. 9 is a top view for explaining a method of determining the reference output force value of each of generators 20 of unmanned aircraft 1 according to the first example.

In a supposed case where, for example, the center of gravity of the freight is calculated as being located in the center of gravity zone shown in FIG. 8A, the position of the center of gravity is shown as position C1 in FIG. 9. An intersecting point of the straight line connecting position P1 and position P2 and the straight line connecting position P3 and position P4 is shown as origin point O, "x" indicates the distance from a normal that is perpendicular to the straight line connecting position P1 and position P2 and that passes through origin point O to position C1 at the side of position P2, and "y" indicates the distance from a normal that is perpendicular to the straight line connecting position P3 and position P4 and that passes through origin point O to position C1 at the side of position P3. Also, "a" indicates the distance between origin point O and each of positions B1 through B4, and "b" indicates the distance between origin point O and each of positions P1 through P4, Also, "θ" indicates an angle formed by the straight line connecting position P1 and position P2 and the straight line connecting position P1 and position P3.

Note that in the case where the center of gravity of the freight is calculated as being located in the center of gravity zone shown in FIG. 8B, "x" indicates the distance from a normal that is perpendicular to the straight line connecting position P1 and position P2 and that passes through origin point O to position C1 at the side of position P1, and "y" indicates the distance from a normal that is perpendicular to the straight line connecting position P3 and position P4 and that passes through origin point O to position C1 at the side of position P3. In the case where the center of gravity of the freight is calculated as being located in the center of gravity zone shown in FIG. 8C, "x" indicates the distance from a normal that is perpendicular to the straight line connecting position P1 and position P2 and that passes through origin point O to position C1 at the side of position P1, and "y" indicates the distance from a normal that is perpendicular to the straight line connecting position P3 and position P4 and that passes through origin point O to position C1 at the side of position P4. Also, in the case where the center of gravity of the freight is calculated as being located in the center of gravity zone shown in FIG. 8D, "x" indicates the distance from a normal that is perpendicular to the straight line connecting position P1 and position P2 and that passes through origin point O to position C1 at the side of position P2, and "y" indicates the distance from a normal that is perpendicular to the straight line connecting position P3 and position P4 and that passes through origin point O to position C1 at the side of position P4. As described above, the center of gravity zone having been calculated determines which one of positions P1 through P4 the distances "x" and "y" indicate the distances to.

Assume that the reference output force values (lift values) of the respective generators 20 at which unmanned aircraft 1 is able to fly in a horizontal attitude in hovering flight are as follows: $T_{P1}$ for generator 20 in position P1; $T_{P2}$ for generator 20 in position P2; $T_{P3}$ for generator 20 in position P3; and $T_{P4}$ for generator 20 in position P4. The following describes a method of calculating reference output force values $T_{P1}$ through $T_{P4}$.

Expression 1 below shows the balance between rotational moments in the direction in which position P1 and P2 are connected (e.g., rotational moments in the pitch direction). Note that $F_t$ represents the total weight of unmanned aircraft 1.

[Math. 1]

$$T_{P1}b + T_{P4}b \cos 2\theta + F_t x = T_{p2}b + T_{P3}b \cos 2\theta \quad \text{(Expression 1)}$$

Expression 2 below shows the balance between rotational moments in the direction in which position P3 and P4 are connected (e.g., rotational moments in the roll direction).

[Math. 2]

$$T_{P3}b + T_{P2}b\cos 2\theta = T_{P4}b + T_{P1}b\cos 2\theta + F_t y \quad \text{(Expression 2)}$$

Expression 3 below shows the balance between forces in the up and down direction (vertical direction).

[Math. 3]

$$F_t = T_{P1} + T_{P2} + T_{P3} + T_{P4} \quad \text{(Expression 3)}$$

Expression 4 blow shows the balance between forces in the direction of horizontal rotations (e.g., yaw direction) caused by the reaction force of the rotations of the rotor blades of generators 20. Note that the rotor blades of generators 20 that are opposite to each other on a diagonal line rotate in different directions.

[Math. 4]

$$T_{P1} + T_{P2} = T_{P3} + T_{P4} \quad \text{(Expression 4)}$$

Assuming that $F_{p1}$ is the output force value (lift value) of generator 20 in position P1 when such generator 20 is individually operated, $F_{p2}$ is the output force value (lift value) of generator 20 in position P2 when such generator 20 is individually operated, $F_{p3}$ is the output force value (lift value) of generator 20 in position P3 when such generator 20 is individually operated, and $F_{p4}$ is the output force value (lift value) of generator 20 in position P4 when such generator 20 is individually operated, total weight $F_t$ of unmanned aircraft 1, and distance "x" and distance "y" are calculated as shown below.

$$F_t = \frac{a+b}{2a}(F_{P2} + F_{P3}) \quad \text{(Expression 5)}$$

[Math. 6]

$$x = a - \frac{2a(F_{P1}\cos^2\theta + F_{P3}\sin^2\theta)}{F_{P2} + F_{P3}} \quad \text{(Expression 6)}$$

[Math. 7]

$$y = a - \frac{2a(F_{P1}\cos^2\theta + F_{P2}\sin^2\theta)}{F_{P2} + F_{P3}} \quad \text{(Expression 7)}$$

From Expression 5 through Expression 7, $F_t x$ in Expression 1 and $F_t y$ in Expression 2 are represented as in Expression 8 and Expression 9 below, respectively.

[Math. 8]

$$F_t x = (a+b)\left\{\frac{1}{2}(F_{P2}+F_{P3}) - (F_{P1}\cos^2\theta + F_{P3}\sin^2\theta)\right\} \quad \text{(Expression 8)}$$

[Math. 9]

$$F_t y = (a+b)\left\{\frac{1}{2}(F_{P2}+F_{P3}) - (F_{P1}\cos^2\theta + F_{P2}\sin^2\theta)\right\} \quad \text{(Expression 9)}$$

Expression 1 is represented as Expression 10 below from Expression 8, Expression 2 as Expression 11 below from Expression 9, and Expression 3 as Expression 12 below from Expression 5.

[Math. 10]

$$(T_{P2} - T_{P2}) + (T_{P3} - T_{P4})\cos 2\theta = \quad \text{(Expression 10)}$$
$$\frac{a+b}{b}\left\{\frac{1}{2}(F_{P2}+F_{P3}) - (F_{P1}\cos^2\theta + F_{P3}\sin^2\theta)\right\}$$

[Math. 11]

$$(T_{P2} - T_{P1})\cos 2\theta + (T_{P3} - T_{P4}) = \quad \text{(Expression 11)}$$
$$\frac{a+b}{b}\left\{\frac{1}{2}(F_{P2}+F_{P3}) - (F_{P1}\cos^2\theta + F_{P2}\sin^2\theta)\right\}$$

[Math. 12]

$$T_{P1} + T_{P2} + T_{P3} + T_{P4} = \frac{a+b}{2a}(F_{P2}+F_{P3}) \quad \text{(Expression 12)}$$

Expression 13 below is derived from the expression obtained by multiplying the left and right parts in Expression 10 by cos θ and from Expression 11, and Expression 14 below is derived from Expression 10 and the expression obtained by multiplying the left and right parts in Expression 11 by cos θ.

[Math. 13]

$$T_{P3} - T_{P4} = \frac{a+b}{2b}(F_{P3} - F_{P1}) \quad \text{(Expression 13)}$$

[Math. 14]

$$T_{P1} - T_{P2} = \frac{a+b}{2b}(F_{P1} - F_{P2}) \quad \text{(Expression 14)}$$

From Expression 4 and Expression 12, Expression 15 below is derived.

[Math. 15]

$$T_{P1} + T_{P2} = T_{P3} + T_{P4} = \frac{a+b}{4a}(F_{P2}+F_{P3}) \quad \text{(Expression 15)}$$

From Expression 14 and Expression 15, reference output force value (lift value) $T_{p1}$ of generator 20 in position P1 is calculated as Expression 16 below.

[Math. 16]

$$T_{P1} = \frac{a+b}{8ab}\{2aF_{P1} + (b-2a)F_{P2} + bF_{P3}\} \quad \text{(Expression 16)}$$

Also, from Expression 14 and Expression 15, reference output force value (lift value) $T_{p2}$ of generator 20 in position P2 is calculated as Expression 17 below.

[Math. 17]

$$T_{P2} = \frac{a+b}{8ab}\{-2aF_{P1} + (b+2a)F_{P2} + bF_{P3}\} \quad \text{(Expression 17)}$$

Also, from Expression 13 and Expression 15, reference output force value (lift value) $T_{p3}$ of generator 20 in position P3 is calculated as Expression 18 below.

[Math. 18]

$$T_{P3} = \frac{a+b}{8ab}\{-2aF_{P1} + bF_{P2} + (b-2a)F_{P3}\}$$ (Expression 18)

Also, from Expression 13 and Expression 15, reference output force value (lift value) $T_{p4}$ of generator 20 in position P4 is calculated as Expression 19 below.

[Math. 19]

$$T_{P4} = \frac{a+b}{8ab}\{2aF_{P1} + bF_{P2} + (b-2a)F_{P3}\}$$ (Expression 19)

As described above, processor 100 determines the reference output force values of at least two generators 20 (e.g., $T_{p1}$ through $T_{p4}$), on the basis of the output force values of at least two generators 20 (e.g., $F_{p1}$ through $F_{p4}$) at the timing at which the tilt of unmanned aircraft 1 satisfies the predetermined condition and the center of gravity of unmanned aircraft 1 (e.g., distances "x" and "y" to position C1) calculated from the positional relationship among at least two generators 20 (e.g., positions P1 through P4, and B1 through B4).

Reverting to the description with reference to FIG. 5, processor 100 determines whether each of the reference output force values is within the acceptable range (Step S34). The acceptable range is, for example, a value range less than the upper limit of the rotational speed (instruction value) at which the rotor blade of each generator 20 can rotate.

In the case where each of the reference output force value is within the acceptable range (Yes in step S34), processor 100 determines whether the determination of the reference output force values has been completed. When determining that the determination of the reference output force values has been completed, processor 100 presents via presentation unit 50 information indicating that the determination of the reference output force values has been completed (step S35). This enables to present information indicating that the determination of the reference output force values has been completed to the operator of unmanned aircraft 1, thereby enabling the operator to start, for example, the normal flight of unmanned aircraft 1.

Processor 100 then controls the flight of unmanned aircraft 1, using the respective reference output force values having been determined (step S36).

Meanwhile, in the case where any one of the reference output force values is not within the acceptable range (No in step S34), processor 100 presents information via presentation unit 50 indicating that one of the reference output force values is not within the acceptable range (step S37). When the position of the center of gravity of the freight is largely deviated from the center of unmanned aircraft 1 in a top view of unmanned aircraft 1, for example, there is a possibility that a reference output force value does not fall within the acceptable range. When the position of the center of gravity is largely deviated in the direction of any one of at least two generators 20, for example, the reference output force value of such generator can be extremely large. In such situation, the present configuration enables to present such fact to the operator of unmanned aircraft 1, thus enabling the operator to, for example, change freights or adjust the loading positions of the freight.

Unmanned aircraft 1 according to the first example has been described above in which the positional relationship and the number of generators 20 and supporting legs 60 are as shown in FIG. 7, but the positional relationship and the number of generators 20 and supporting legs 60 are not limited such configuration. The following describes the second through fourth examples having a different positional relationship and number of generators 20 and supporting legs 60 from those in the first example.

Figure 10:
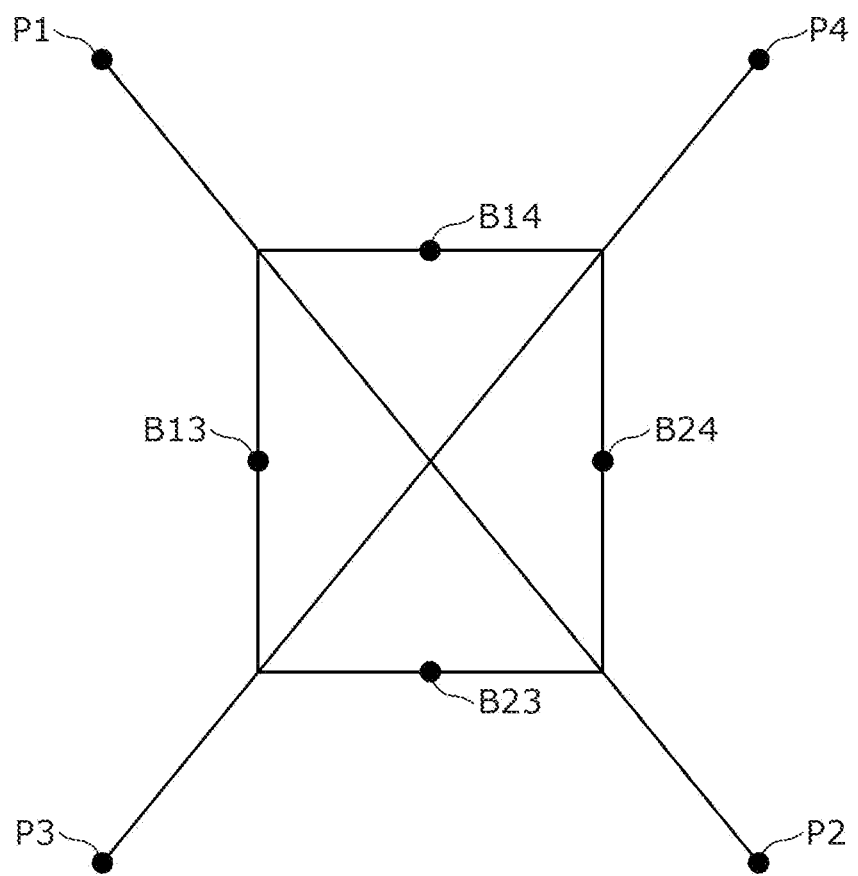
FIG. 10 is a top view of the positional relationship among generators and supporting legs of the unmanned aircraft according to a second example.
Figure 11:
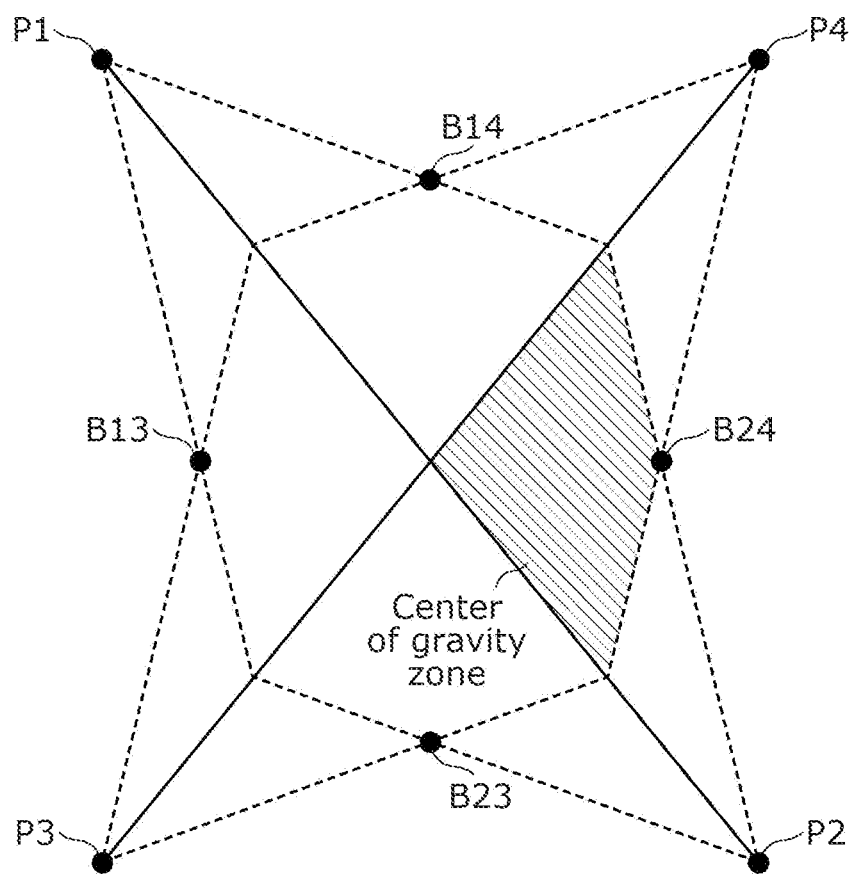
FIG. 11 is a top view of an exemplary center of gravity zone of the freight on the unmanned aircraft according to the second example.

FIG. 10 is a top view of the positional relationship among generators 20 and supporting legs 60 of unmanned aircraft 1 according to the second example. FIG. 11 is a top view of an exemplary center of gravity zone of the freight on unmanned aircraft 1 according to the second example.

Positions P1 through P4 shown in FIG. 10 and FIG. 11 indicate the positions of generators 20 (more specifically, the central positions of the respective rotor blades), and positions B13, B14, B23, and B24 indicate the positions of supporting legs 60 (more specifically, that positions of supporting legs 60 which are in contact with the ground).

As shown in FIG. 10, position P1 and position P2 are located on a diagonal line, and position P3 and position P4 are located on a diagonal line. Also, position B13 and position B24 are located on a diagonal line, and position B14 and position B23 are located on a diagonal line. Position B13 and position B24 are located on a bisector of the line segment connecting position P1 and P3 (such bisector is also a bisector of the line segment connecting position P2 and position P4), and position B14 and position B23 are located on a bisector of the line segment connecting position P1 and P4 (such bisector is also a bisector of the line segment connecting position P2 and position P3). Also, position B13 is provided at the side of position P1 and position P3, position 1314 at the side of position P1 and position P4, position B23 at the side of position P2 and position P3, and position B24 at the side of position P2 and position P4, The positional relationship and the number of generators 20 and supporting legs 60 in the second example are as described above.

As with the first example, when one generator 20 is individually operated, two of supporting legs 60 rise up from the ground, with the other two supporting legs 60 basically in contact with the ground.

When generator 20 in position P1 is individually operated and supporting legs 60 in position B14 and position B24 start rising up from the ground, with supporting legs 60 in positions B13 and B23 in contact with the ground, the center of gravity of the freight is calculated as being located at the side of position P3 with respect to the straight line connecting positions P1 and P2. When supporting legs 60 in positions B13 and position B23 start rising up from the ground, with supporting legs 60 in positions 314 and B24 in contact with the ground, the center of gravity of the freight is calculated as being located at the side of position P4 with respect to the straight line connecting positions P1 and P2.

When generator 20 in position P2 is individually operated and supporting legs 60 in position B13 and position B23 start rising up from the ground, with supporting legs 60 in positions B14 and B24 in contact with the ground, the center of gravity of the freight is calculated as being located at the side of position P4 with respect to the straight line connecting positions P1 and P2. When supporting legs 60 in positions B14 and position B24 start rising up from the ground, with supporting legs 60 in positions B13 and B23 in contact with the ground, the center of gravity of the freight is calculated as being located at the side of position P3 with respect to the straight line connecting positions P1 and P2.

When generator 20 in position P3 is individually operated and supporting legs 60 in position B23 and position B24 start rising up from the ground, with supporting legs 60 in positions B13 and B14 in contact with the ground, the center of gravity of the freight is calculated as being located at the side of position P1 with respect to the straight line connecting positions P3 and P4. When supporting legs 60 in positions B13 and position B14 start rising up from the ground, with supporting legs 60 in positions B23 and B24 in contact with the ground, the center of gravity of the freight is calculated as being located at the side of position P2 with respect to the straight line connecting positions P3 and P4.

When generator 20 in position P4 is individually operated and supporting legs 60 in position B13 and position B14 start rising up from the ground, with supporting legs 60 in positions B23 and B24 in contact with the ground, the center of gravity of the freight is calculated as being located at the side of position P2 with respect to the straight line connecting positions P3 and P4. When supporting legs 60 in positions B23 and position B24 start rising up from the ground, with supporting legs 60 in positions B13 and B14 in contact with the ground, the center of gravity of the freight is calculated as being located at the side of position P1 with respect to the straight line connecting positions P3 and P4.

The center of gravity of the freight is calculated as being located in the center of gravity zone shown in FIG. 11, for example, when: generator 20 in position P1 is individually operated and supporting legs 60 in position B13 and position B23 start rising up from the ground; generator 20 in position P2 is individually operated and supporting legs 60 in position B13 and position B23 start rising up from the ground; generator 20 in position P3 is individually operated and supporting legs 60 in position B13 and position B14 start rising up from the ground; and generator 20 in position P4 is individually operated and supporting legs 60 in position B13 and position B14 start rising up from the ground. The description will be omitted of the case where the center of the gravity of the freight is calculated as being located in another center of gravity zone.

Note that the reference output force values of generators 20 of unmanned aircraft 1 according to the second example can be calculated from expressions that are based on the balance between moments, forces, etc. as with the first example, and thus a detailed description of a method of calculating the reference output force values is omitted here.

Figure 12:
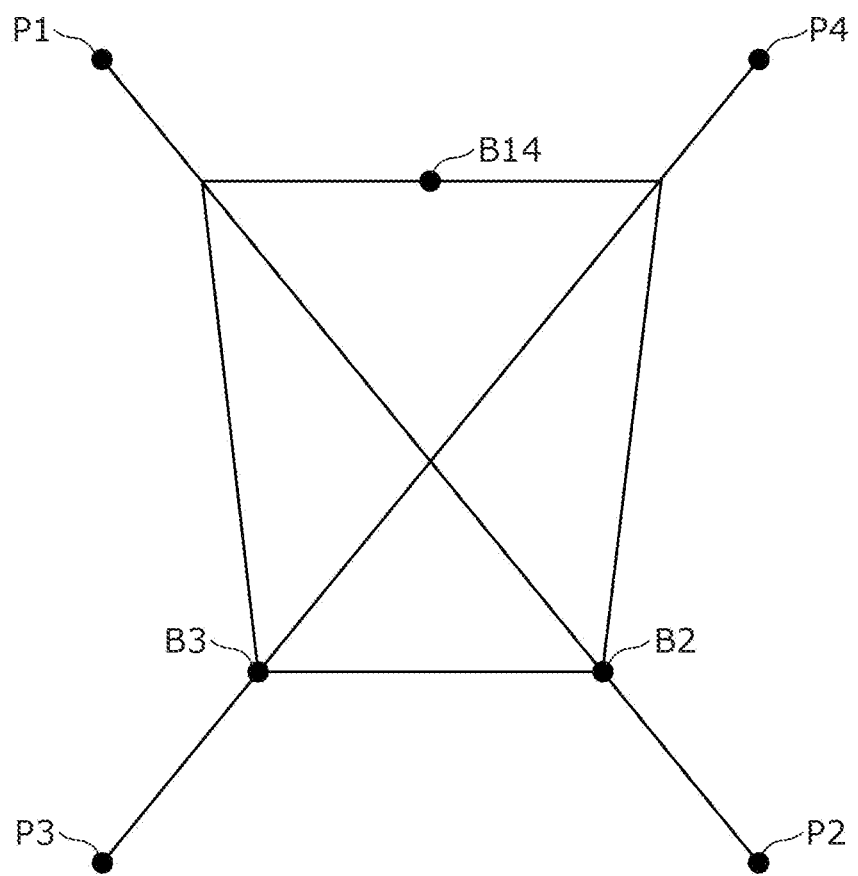
FIG. 12 is a top view of the positional relationship among generators and supporting legs of the unmanned aircraft according to a third example.
Figure 13:
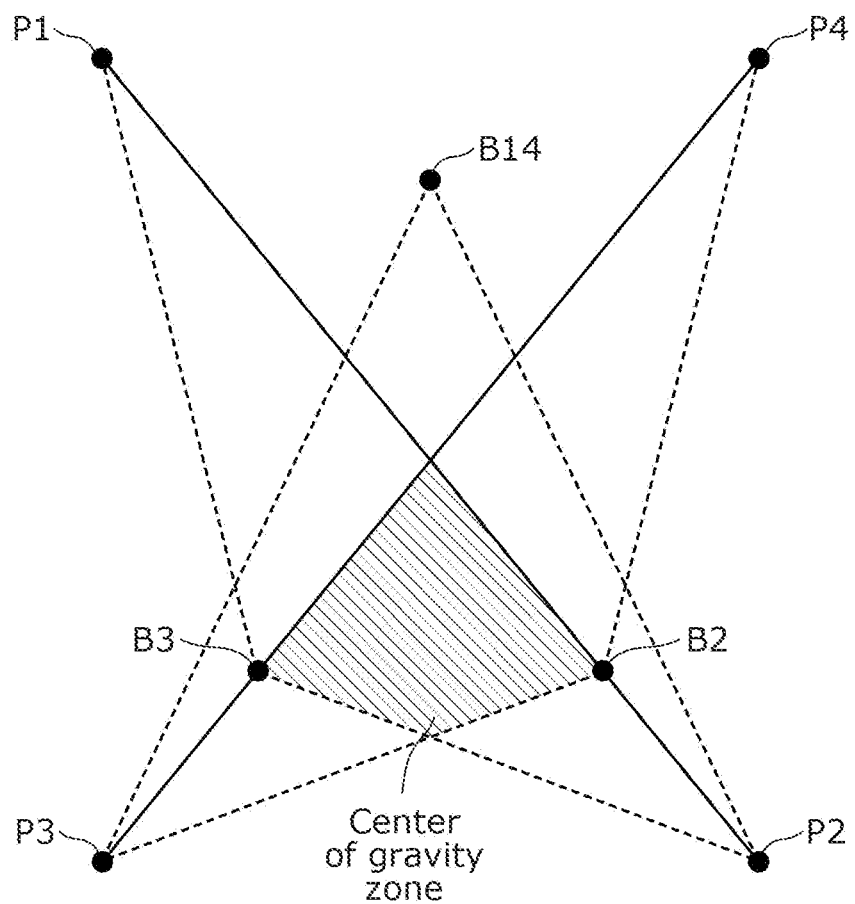
FIG. 13 is a top view of an exemplary center of gravity zone of the freight on the unmanned aircraft according to the third example.

FIG. 12 is a top view of the position& relationship among generators 20 and supporting legs 60 of unmanned aircraft 1 according to the third example. FIG. 13 is a top view of an exemplary center of gravity zone of the freight on unmanned aircraft 1 according to the third example.

Positions P1 through P4 shown in FIG. 12 and FIG. 13 indicate the positions of generators 20 (more specifically, the central positions of the respective rotor blades), and positions B2, B3, and B14 indicate the positions of supporting legs 60 (more specifically, that positions of supporting legs 60 which are in contact with the ground).

As shown in FIG. 12, position P1 and position P2 are located on a diagonal line, and position P3 and position P4 are located on a diagonal line. Also, position B2 and position B3 correspond to the ones in the first example, and position P14 corresponds to the one in the second example. The positional relationship and the number of generators 20 and supporting legs 60 in the third example are as described above.

In the third example, when one generator 20 is individually operated, one of supporting legs 60 rises up from the ground, with the other two supporting legs 60 basically in contact with the ground, When generator 20 in position P1 is individually operated and supporting leg 60 in position B14 starts rising up from the ground, with supporting legs 60 in positions B2 and B3 in contact with the ground, the center of gravity of the freight is calculated as being located at the side of position P3 with respect to the straight line connecting positions P1 and P2. When supporting leg 60 in position B3 starts rising up from the ground, with supporting legs 60 in positions B14 and B2 in contact with the ground, the center of gravity of the freight is calculated as being located at the side of position P4 with respect to the straight line connecting positions P1 and P2, When generator 20 in position P4 is individually operated and supporting leg 60 in position B14 starts rising up from the ground, with supporting legs 60 in positions B2 and B3 in contact with the ground, the center of gravity of the freight is calculated as being located at the side of position P2 with respect to the straight line connecting positions P3 and P4. When supporting leg 60 in position B2 starts rising up from the ground, with supporting legs 60 in positions B14 and B3 in contact with the ground, the center of gravity of the freight is calculated as being located at the side of position P1 with respect to the straight line connecting positions P3 and P4.

When generator 20 in position P2 is individually operated, supporting leg 60 in position B2 starts rising up from the ground, with supporting legs 60 in positions B14 and B3 in contact with the ground, regardless of the position of the center of gravity of the freight. Also, when generator 20 in position P3 is individually operated, supporting leg 60 in position B3 starts rising up from the ground, with supporting legs 60 in positions B14 and B2 in contact with the ground, regardless of the position of the center of gravity of the freight.

The center of gravity of the freight is calculated as being located in the center of gravity zone shown in FIG. 13, for example, when: generator 20 in position P1 is individually operated and supporting leg 60 in position B14 starts rising up from the ground;

and generator 20 in position P4 is individually operated and supporting leg 60 in position B14 starts rising up from the ground. The description will be omitted of the case where the center of the gravity of the freight is calculated as being located in another center of gravity zone.

Note that the reference output force values of generators 20 of unmanned aircraft 1 according to the third example can be calculated from expressions that are based on the balance between moments, forces, etc. as with the first example, and thus a detailed description of a method of calculating the reference output force values is omitted here.

Figure 14:
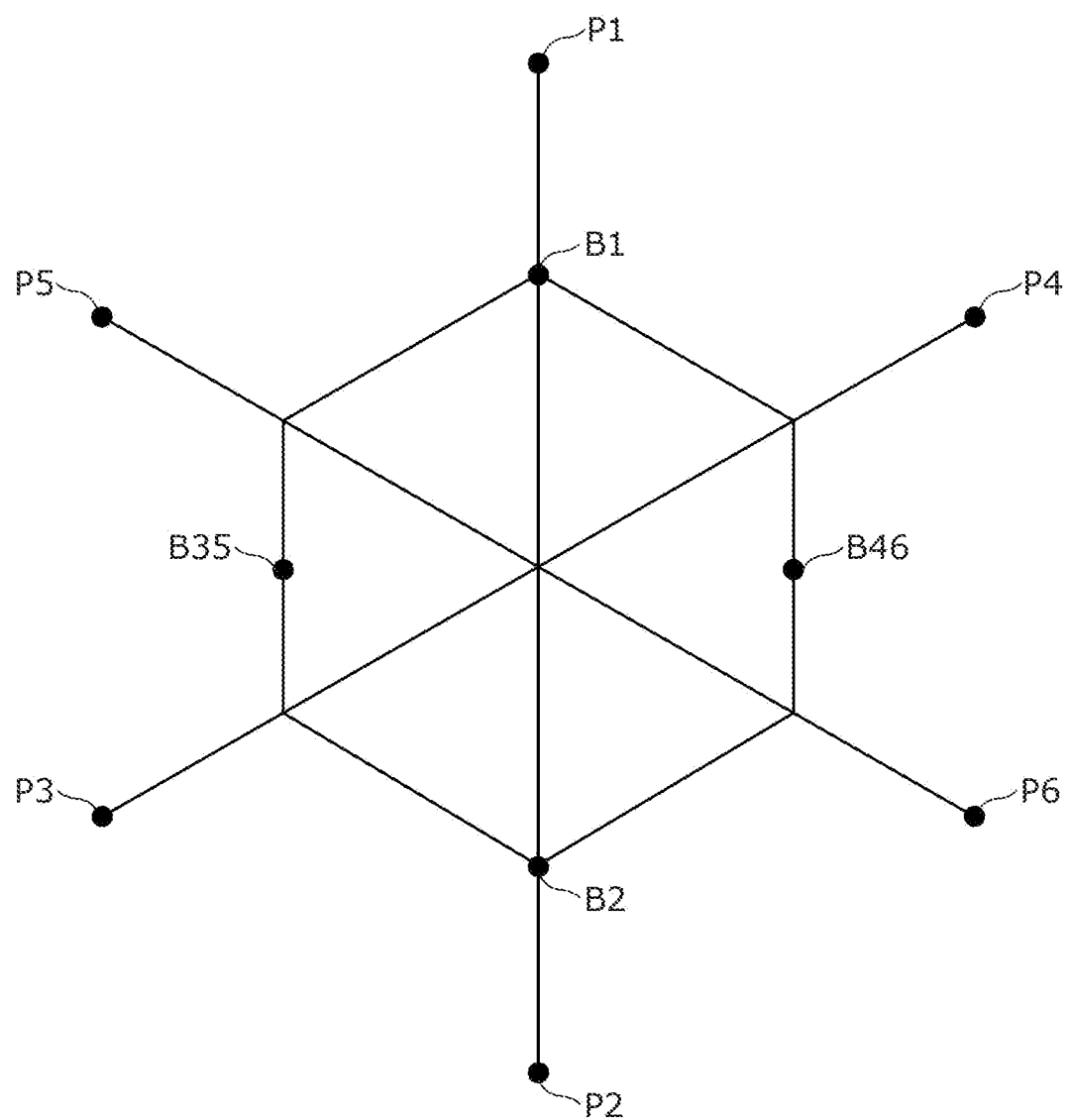
FIG. 14 is a top view of the positional relationship among generators and supporting legs of the unmanned aircraft according to a fourth example.
Figure 15:
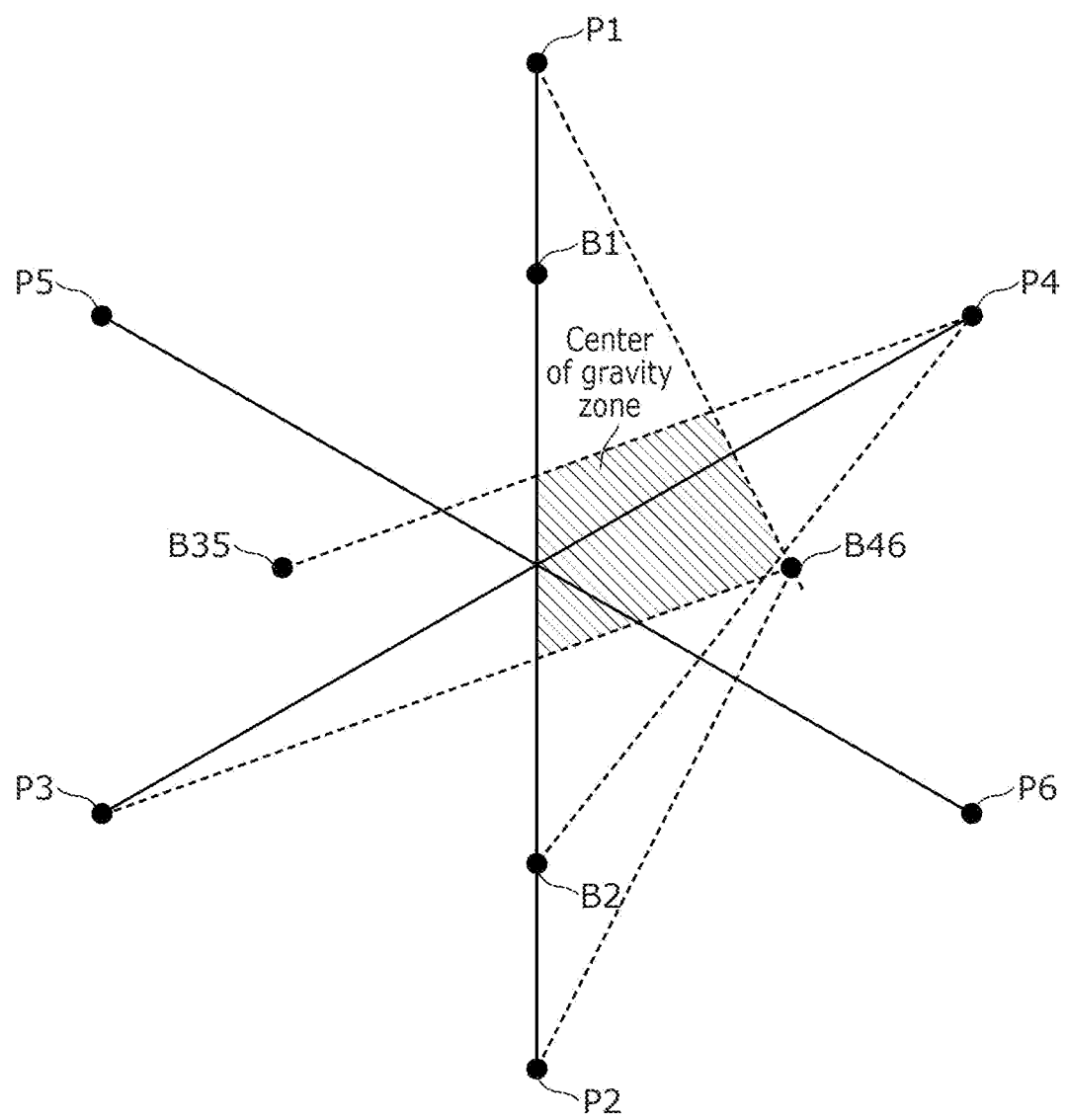
FIG. 15 is a top view of an exemplary center of gravity zone of the freight on the unmanned aircraft according to the fourth example.

FIG. 14 is a top view of the positional relationship among generators 20 and supporting legs 60 of unmanned aircraft 1 according to the fourth example, FIG. 15 is a top view of an exemplary center of gravity zone of the freight on unmanned aircraft 1 according to the fourth example.

Positions P1 through P6 shown in FIG. 14 and FIG. 15 indicate the positions of generators 20 (more specifically, the central positions of the respective rotor blades), and positions B1, B2, B35, and B46 indicate the positions of supporting legs 60 (more specifically, that positions of supporting legs 60 which are in contact with the ground).

As shown in FIG. 14, position P1 and position P2 are located on a diagonal line, position P3 and position P4 are located on a diagonal line, and position P5 and position P6 are located on a diagonal line. Also, position B1 and position B2 are located on a diagonal line, and position B35 and position B46 are located on a diagonal line. The positional relationship and number of generators 20 and supporting legs 60 in the fourth example are as described above.

As with the first example, when one generator 20 is individually operated, two of supporting legs 60 rise up from the ground, with the other two supporting legs 60 basically in contact with the ground.

Also in the case where an increased number of generators 20 are present compared to the first through third examples, as in the fourth example, which one of the center of gravity zones the center of gravity of the freight is located is calculated by individually operating generators 20 one by one, as in the case of first through third examples, although its details are not described here.

Note that the reference output force values of generators 20 of unmanned aircraft 1 according to the fourth example can be calculated from expressions that are based on the balance between moments, forces, etc. as with the first example, and thus a detailed description of a method of calculating the reference output force values is omitted here.

As described above, each of at least two generators 20 is individually operated to calculate their respective output force values at that time. The output force values of at least two generators 20 when they are individually operated are, for example, different from one another. More specifically, the output force value of generator 20 close to the position of the center of gravity is larger, and the output force value of generator 20 distant from the position of the center of gravity is smaller. The reference output force values of at least two generators 20 are then determined from the output force values of at least two generators 20 and their positional relationship (more specifically, the center of gravity of unmanned aircraft 1 calculated from such positional relationship). The reference output force values of at least two generators 20 are, for example, different from one another. More specifically, such reference output force values are output force values at which unmanned aircraft 1 is able to fly in a horizontal attitude in hovering flight. The use of these reference output force values in the flight of unmanned aircraft 1 prevents unmanned aircraft 1 from being tilted. Unmanned aircraft 1 is thus capable of flying with stability even when loaded with freight. The present disclosure is achieved, for example, by use of sensor 30, such as a gyroscope sensor, that is originally included in unmanned aircraft 1, without needing to additionally use a weight scale, etc.

Another Embodiment

Unmanned aircraft 1 according to one or more aspects of the present disclosure has been described above on the basis of the embodiment, but the present disclosure is not limited to such embodiment. The scope of one or more aspects of the present disclosure also includes: a variation achieved by making various modifications to each embodiment that can be conceived by those skilled in the art without departing from the essence of the present disclosure; and an embodiment achieved by combining structural components in different embodiments.

For example, the output force adjustment trigger in the foregoing embodiment is an output force adjustment instruction or a flight instruction obtained via communication unit 40, but the present disclosure is not limited to this configuration. Thus, unmanned aircraft 1 may further include, for example, an operation interface. In this case, the output force adjustment trigger may be an output force adjustment instruction obtained via the operation interface. Examples of the operation interface include: a button, a touch panel, etc. included in unmanned aircraft 1 into which an operation instruction is physically inputted by an operator, etc.; and a microphone, etc. into which the voice of the operator, etc, is inputted. This enables to start the process that achieves stable flight of unmanned aircraft 1 by operating unmanned aircraft 1.

Also, for example, unmanned aircraft 1 in the foregoing embodiment includes, but may not include, presentation unit 50. For example, processor 100 may present information indicating that a reference output force value is not within the acceptable range or that the determination of the reference output force values has been completed via a presentation unit included in a mobile terminal, etc. owned by the operator, etc.

Also, for example, processor 100 in the foregoing embodiment determines whether a reference output force value is within the acceptable range, but may not make such determination. Also, for example, processor 100 determines whether the determination of the reference output force values has been completed, but may not make such determination.

Also, for example, processor 100 starts the output force adjustment process upon obtaining a flight instruction as an output force adjustment trigger, but the present disclosure is not limited to this configuration. For example, processor 100 may control the flight of unmanned aircraft 1 first, and may not perform the output force adjustment process when unmanned aircraft 1 is able to fly in a horizontal attitude in hovering flight. Stated differently, processor 100 may control the flight of unmanned aircraft 1 first, and may perform the output force adjustment process when unmanned aircraft 1 fails to fly in a horizontal attitude in hovering flight.

The present disclosure can be implemented not only as unmanned aircraft 1, but also as, for example, an information processing method that includes steps (processes) performed by the structural components included in unmanned aircraft 1, As shown in FIG. 3, the information processing method is an information processing method of controlling unmanned aircraft 1 that includes: at least two generators 20 that generate forces to fly unmanned aircraft 1, at least two generators 20 each including a rotor blade that generates an airflow; and sensor 30 that detects a tilt of unmanned aircraft 1. Such information processing method is executed by a computer to control unmanned aircraft 1 by controlling at least two generators 20. The information processing method includes: obtaining an output force adjustment trigger for at least two generators 20 (step S11); upon obtainment of the output force adjustment trigger, causing each of at least two generators 20 to individually operate at least until the tilt of unmanned aircraft 1 detected by sensor 30 satisfies a predetermined condition (step S12); determining a reference value related to an output force of each of at least two generators 20 from (i) a value related to the output force of each of at least two generators 20 at a timing at which the tilt of unmanned aircraft 1 satisfies the predetermined condition and (ii) a positional relationship between at least two generators 20 (step S13); and controlling the flight of unmanned aircraft 1, using the reference values determined (step S15).

For example, the steps included in such information processing method may be executed by a computer (computer system). A device (e.g., server device) capable of communicating with unmanned aircraft 1, for example, may execute the steps included in the information processing method. The present disclosure can be implemented as a program for causing a computer to execute the steps included in such information processing method. Further, the present disclosure can be implemented as a non-transitory, computer-readable recording medium, such as a CD-ROM, storing such program, When the present disclosure is implemented as a program (software), for example, the steps are executed by the program being executed by use of hardware resources of a computer, such as a CPU, a memory, and an input-output force circuit. More specifically, the steps are executed by the CPU obtaining data from the memory, the input-output force circuit, or another hardware resource to perform calculations, and outputting calculation results to the memory, the input-output force circuit, or another hardware resource.

Moreover, in the foregoing embodiment, the structural components included in unmanned aircraft 1 may be implemented as dedicated hardware or may be implemented by executing a software program suited to each of the structural components. Alternatively, the structural components may be implemented by a program executor such as a CPU and a processor reading out and executing the software program recorded in a recording medium such as a hard disk and a semiconductor memory.

One or more, or all of the functions of unmanned aircraft 1 according to the foregoing embodiment can be implemented as an LSI, which is typically an integrated circuit. The functions may take the form of individual chips, or one or more, or all of the functions may be encapsulated into a single chip. Such ICs are not limited to LSI. Each of the functions thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

Also, one or more, or all of the functions of unmanned aircraft 1 according to the foregoing embodiment may be implemented by a processor such as a CPU executing the program.

Numerics used in the above description are all examples to specifically describe the present disclosure, and thus the present disclosure is not limited to such exemplary numerics.

The processing order of the steps are an example to specifically describe the present disclosure, and thus the steps may be executed in a different order from the above-described order within the bounds in which similar effects are obtained. Also, one or more of the steps may be executed simultaneously (e.g., in parallel) with another step.

The present disclosure also includes variations achieved by making alterations to the embodiment according to the present disclosure that can be conceived by those skilled in the art without departing from the essence of the present disclosure.

INDUSTRIAL APPLICABILITY

The present disclosure is applicable for use, for example, as an unmanned aircraft for freight delivery.

The invention claimed is:

1. An unmanned aircraft comprising:
at least two supporting legs;
at least two generators that generate forces to fly the unmanned aircraft, the at least two generators each including a rotor blade that generates an airflow;
a sensor that detects a tilt of the unmanned aircraft; and
a processor that controls the at least two generators to control flight of the unmanned aircraft,
wherein the processor:
obtains, in a state in which the unmanned aircraft is placed on a ground that is horizontal, an output force adjustment trigger for the at least two generators;
upon obtaining the output force adjustment trigger, causes each of the at least two generators to individually operate in a state in which at least one of the at least two supporting legs is in contact with the ground and at least until the tilt of the unmanned aircraft detected by the sensor satisfies a predetermined condition;
determines a reference value related to an output force of each of the at least two generators from (i) a value related to the output force of each of the at least two generators at a timing at which the tilt of the unmanned aircraft satisfies the predetermined condition and (ii) a positional relationship between the at least two generators; and
controls the flight of the unmanned aircraft, using the reference values determined.

2. The unmanned aircraft according to claim 1, wherein the predetermined condition is that the tilt of the unmanned aircraft changes.

3. The unmanned aircraft according to claim 1, wherein the reference value is an output force value at which the unmanned aircraft is able to fly in a horizontal attitude in hovering flight.

4. The unmanned aircraft according to claim 1, wherein the processor determines the reference value of each of the at least two generators, based on (i) the value related to the output force of each of the at least two generators at the timing at which the tilt of the unmanned aircraft satisfies the predetermined condition and (ii) a center of gravity of the unmanned aircraft that is calculated from the positional relationship between the at least two generators.

5. The unmanned aircraft according to claim 1, further comprising:
a communication unit,
wherein the output force adjustment trigger is an output force adjustment instruction or a flight instruction obtained via the communication unit.

6. The unmanned aircraft according to claim 1, further comprising:
an operation interface,
wherein the output force adjustment trigger is an output force adjustment instruction obtained via the operation interface.

7. The unmanned aircraft according to claim 1, wherein the processor further determines whether the reference value is within an acceptable range, and presents information indicating that the reference value is not within the acceptable range via a presentation unit when the reference value is not within the acceptable range.

8. The unmanned aircraft according to claim 1, wherein the processor further determines whether a determination of the reference value has been completed, and presents information indicating that the determination of the reference value has been completed via a presentation unit when the determination of the reference value has been completed.

9. An information processing method of controlling an unmanned aircraft that includes: at least two supporting legs; at least two generators that generate forces to fly the unmanned aircraft, the at least two generators each including a rotor blade that generates an airflow; and a sensor that detects a tilt of the unmanned aircraft, the information processing method being executed by a computer to control the unmanned aircraft by controlling the at least two generators, the information processing method comprising:

obtaining, in a state in which the unmanned aircraft is placed on a ground that is horizontal, an output force adjustment trigger for the at least two generators;

upon obtainment of the output force adjustment trigger, causing each of the at least two generators to individually operate in a state in which at least one of the at least two supporting legs is in contact with the ground and at least until the tilt of the unmanned aircraft detected by the sensor satisfies a predetermined condition;

determining a reference value related to an output force of each of the at least two generators from (i) a value related to the output force of each of the at least two generators at a timing at which the tilt of the unmanned aircraft satisfies the predetermined condition and (ii) a positional relationship between the at least two generators; and controlling the flight of the unmanned aircraft, using the reference values determined.

10. A non-transitory computer-readable recording medium having a program recorded thereon that causes a computer to execute an information processing method of controlling an unmanned aircraft that includes: at least two supporting legs; at least two generators that generate forces to fly the unmanned aircraft, the at least two generators each including a rotor blade that generates an airflow; and a sensor that detects a tilt of the unmanned aircraft, the information processing method being executed by a computer to control the unmanned aircraft by controlling the at least two generators, the information processing method comprising:

obtaining, in a state in which the unmanned aircraft is placed on a ground that is horizontal, an output force adjustment trigger for the at least two generators;

upon obtainment of the output force adjustment trigger, causing each of the at least two generators to individually operate in a state in which at least one of the at least two supporting legs is in contact with the ground and at least until the tilt of the unmanned aircraft detected by the sensor satisfies a predetermined condition;

determining a reference value related to an output force of each of the at least two generators from (i) a value related to the output force of each of the at least two generators at a timing at which the tilt of the unmanned aircraft satisfies the predetermined condition and (ii) a positional relationship between the at least two generators; and controlling the flight of the unmanned aircraft, using the reference values determined.

* * * * *